United States Patent
Kinahan et al.

(10) Patent No.: US 11,344,888 B2
(45) Date of Patent: May 31, 2022

(54) FLUIDIC DEVICE FOR ALIQUOTING AND COMBINATORIAL MIXING OF LIQUIDS

(71) Applicant: DUBLIN CITY UNIVERSITY, Dublin (IE)

(72) Inventors: David Kinahan, Kildare (IE); Jens Ducree, Meath (IE)

(73) Assignee: DUBLIN CITY UNIVERSITY, Dublin (IE)

( * ) Notice: Subject to any disclaimer, the term of this patent is extended or adjusted under 35 U.S.C. 154(b) by 207 days.

(21) Appl. No.: 16/464,982

(22) PCT Filed: Nov. 28, 2017

(86) PCT No.: PCT/EP2017/080708
§ 371 (c)(1),
(2) Date: May 29, 2019

(87) PCT Pub. No.: WO2018/099922
PCT Pub. Date: Jun. 7, 2018

(65) Prior Publication Data
US 2019/0321820 A1    Oct. 24, 2019

(30) Foreign Application Priority Data
Nov. 30, 2016 (GB) ................................. 1620320

(51) Int. Cl.
*B01L 3/00* (2006.01)
*B01L 9/00* (2006.01)
(Continued)

(52) U.S. Cl.
CPC ...... *B01L 3/50273* (2013.01); *B01F 33/3017* (2022.01); *B01F 33/813* (2022.01);
(Continued)

(58) Field of Classification Search
CPC .... B01L 3/50273; B01L 3/00; B01F 13/0064; B01F 13/1022; B01F 15/0233; B01F 13/00; B01F 13/02
See application file for complete search history.

(56) References Cited

U.S. PATENT DOCUMENTS

2008/0156079 A1    7/2008   Momose
2013/0266483 A1   10/2013   Momose et al.

FOREIGN PATENT DOCUMENTS

| EP | 0297394 A2 | 1/1989 |
| EP | 2762888 A1 | 8/2014 |
| WO | 2011081530 A1 | 7/2011 |

OTHER PUBLICATIONS

Chung. "Highly scalable combinatorial mixing of samples with target-specific primers for rapid pathogen detection on a centrifugal platform." Master of Science Thesis, Dublin City University (2016).

*Primary Examiner* — Brian J. Sines
(74) *Attorney, Agent, or Firm* — Nixon Peabody LLP; David S. Resnick; Nicole D. Kling

(57) ABSTRACT

The present invention relates to fluidic devices, especially microfluidic devices, for aliquoting and pairwise combinatorial mixing of a first set of liquids with a second set of liquids. The device architecture is designed to move liquids in two separate phases, a first phase where the liquids are exposed to a first directional force field to move the liquids in a first direction, from a reservoir to aliquot chambers, and a second phase where the liquids are exposed to a second directional force field to move the liquids in a second direction, from the aliquot chambers to the mixing chambers. The first and second directional force fields that the device is exposed to may be achieved using a single directional force field (i.e. a rotor driven centrifugal force field) and by re-orienting the position of the device with respect to the centrifugal forces between the first and second phases of (Continued)

operation. The device architecture comprises reservoirs for each of the first fluids and reservoirs for each of the second fluids. Each reservoir is fluidically connected to aliquoting chambers, either arranged in parallel or in series, for providing aliquots of the fluid which may be metered. The conduits providing fluid communication between the reservoirs and aliquoting chambers are arranged in a first direction. A series of mixing chambers is also provided, and each mixing chamber is fluidically connected to one aliquot chamber for a first liquid and one aliquoting chamber for a second liquid. The conduits providing fluid communication between the aliquoting chambers and mixing chambers are arranged in a second direction.

22 Claims, 13 Drawing Sheets

(51) Int. Cl.
    *B01F 33/81*     (2022.01)
    *B01F 33/301*     (2022.01)
    *B01F 35/71*     (2022.01)
    *B01F 101/23*     (2022.01)

(52) U.S. Cl.
    CPC .. *B01F 35/71725* (2022.01); *B01L 3/502753* (2013.01); *B01L 9/527* (2013.01); *B01F 2101/23* (2022.01); *B01L 2200/0621* (2013.01); *B01L 2400/0409* (2013.01)

US 11,344,888 B2

FLUIDIC DEVICE FOR ALIQUOTING AND COMBINATORIAL MIXING OF LIQUIDS

CROSS-REFERENCE TO RELATED APPLICATIONS

This application is a 35 U.S.C. § 371 National Phase Entry Application of International Application No. PCT/EP2017/080708 filed Nov. 28, 2017, which designates the U.S. and claims benefit under 35 U.S.C. § 119(a) of GB Provisional Application 1620320.0 filed Nov. 30, 2016, the contents of which are incorporated herein by reference in their entireties.

FIELD OF THE INVENTION

The present invention relates to a fluidic device for aliquoting and combinatorial mixing of a plurality of first liquid samples with a plurality of second liquid samples. Also contemplated are methods of metering and combinatorial mixing of first and second liquid samples.

BACKGROUND TO THE INVENTION

On a centrifugal fluidic platform[1,2], a centrifugal force is induced by rotating a rotor-based fluidic chip which may be a disc-shaped with similar geometry as common CD or DVD optical drives. These so-called "Lab-on-a-Disc" (LoaD) platforms have been engineered towards a variety of applications such as biomedical diagnostics[3], bioprocess monitoring[4] and environmental screening[5-7]. By virtue of their ease-of-use of sample handling absence for pressurised fittings or external pumps, these LoaD systems are particularly useful for near-patient/point-of-care/point of use applications.

Advanced flow control is key in centrifugal microfluidics as all liquid volumes residing on the spinning disc are subject to the centrifugal field. The omnipresence of this field drives all on-board liquids simultaneously outwards, thus often requiring on-disc valving schemes for the temporal control of liquid handling sequences. Such valving can be actuated by changing the centrifugal force acting on the liquid, e.g. by changing the spin rate. Several methods such as surface tension, can include capillary burst valves[8-12], dissolvable film (DF) valves[13-16], burstable foils[17], elastomeric membranes[18] and dead-end pneumatic chambers[19], siphons[4,20,21] and pneumatically enhanced siphons[22-25] have been developed which are primarily based upon the interplay between centrifugally induced hydrostatic pressure and other forces.

An alternative approach is to use a peripheral module to interact with the disc, either while the disc stationary or under rotation. Known methods of such instrument-based, non-centrifugal actuation include external pressure sources[5,26], thermal energy or radiation, e.g. to induce phase-changes[27-30] in wax plugs or ablate sealing films. Flow control has also been implemented by varying the orientation of a chip attached to the rotor within the centrifugal field[31-34].

SUMMARY OF THE INVENTION

The present invention relates to fluidic devices, especially microfluidic devices, for aliquoting (and in one embodiment, metering) and pairwise combinatorial mixing of a first set of liquids with a second set of liquids. The device architecture is designed to move liquids in two separate phases, a first phase where the liquids are exposed to a first directional force field to move the liquids in a first direction, from a reservoir to aliquot (or metering) chambers, and a second phase where the liquids are exposed to a second directional force field to move the liquids in a second direction, from the aliquot chambers to the mixing chambers. The first and second directional force fields that the device is exposed to may be achieved using a single directional force field (i.e. a rotor driven centrifugal force field) and by re-orienting the position of the device with respect to the centrifugal forces between the first and second phases of operation. The device architecture comprises reservoirs for each of the first fluids and reservoirs for each of the second fluids. Each reservoir is fluidically connected to aliquot chambers, either arranged in parallel or in series, for providing aliquots of the fluid. The conduits providing fluid communication between the reservoirs and aliquot chambers are arranged in a first general direction. A series of mixing chambers is also provided, and each mixing chamber is fluidically connected to at least one aliquot chamber for a first liquid and at least one aliquot chamber for a second liquid. The conduits providing fluid communication between the aliquot chambers and mixing chambers are arranged in a general second direction. In one embodiment, the aliquot chambers are configured to provide metered aliquots of the liquids.

As an example, a device for providing metering and combinatorial mixing of three (M) first liquids (i.e. three liquid samples) with three (N) reagents is described. The device comprises six (M+N) reservoirs, one for each of the liquid samples and one for each of the reagents. Each reservoir is fluidically connected to three metering chambers by conduits in a first direction, thus there are 18 metering chambers. M*N (i.e. 9) mixing chambers are provided, and each mixing chamber is fluidically connected to a different pair of metering chambers. Application of a centrifugal field that is aligned with the first direction causes the metering of each liquid sample and reagent into three aliquots of each. Re-orientation of the device such that the centrifugal field is aligned with the second direction causes the aliquots of sample and reagent to move into the mixing chambers. An example is illustrated with reference to FIG. 4.

To provide multiple aliquots of each liquid sample, and combinatorial mixing of the aliquots, in two phases using a first directional force field to move liquid in metering operation and a second directional force field to move liquid in a mixing operation, generally requires that either the metering conduits, or mixing conduits, cross paths. This is facilitated by providing the conduits, or at least parts of the conduits, in different planes of the device. For example, with reference to FIG. 4, the four liquid samples are metered into the sixteen metering chambers by means of conduits located in a first plane (i.e. layer) of the device, and the four reagents are metered into sixteen metering chambers by means of conduits located in a second plane (i.e. layer) of the device. The mixing region of metering/mixing chamber extends across the layers of the device. This provides Y-axis dimensional bridging of the conduits, allowing multiple samples and reagents to be combinatorially mixed.

According to a first aspect, the invention provides a fluidic device for aliquoting and combinatorial mixing of a number M of first liquid samples with a number N of second liquid samples, the microfluidic device comprising:

first reservoirs for each of the M first liquid samples and second reservoirs for each of the N second liquid samples;

N first aliquot chambers fluidically connected to each of first reservoirs by first microfluidic conduits having a first orientation relative to the device;

M second aliquot chambers fluidically connected to each of the second reservoirs by second microfluidic conduits having a first orientation relative to the device; at least M times N mixing chambers, in which each mixing chamber is fluidically connected to at least one of the N first aliquot chambers and at least one of the M second aliquot chambers by third microfluidic conduits having a second orientation relative to the device.

Typically, the first and second microfluidic conduits are configured such that application of a first unidirectional force field effects liquid flow in the first orientation to generate aliquots of the M first liquid samples in the N first aliquot chambers and N second liquid samples in the M first aliquot chambers.

Typically, the third microfluidic conduits are configured such that application of a second unidirectional force field effects liquid flow in the second orientation to combinatorially combine aliquots of the M first liquid samples with aliquots of the N second liquid samples. Generally, at least some of the conduits are spatially separated across the Y-axis of the device.

In another aspect, the invention provides a planar layered microfluidic device for aliquoting and mixing of a plurality of first liquid samples with a plurality of second liquid samples, the planar layered microfluidic device comprising:

first reservoirs for each of the first liquid samples and second reservoirs for each of the second liquid sample;

first aliquot chambers fluidically connected to each of first reservoirs by first microfluidic conduits having a first orientation relative to the device;

second aliquot chambers fluidically connected to each of the second reservoirs by second microfluidic conduits having a first orientation relative to the device;

a plurality of mixing chambers, in which at least some of the mixing chamber are fluidically connected to one of the first aliquot chambers and one of the second aliquot chambers by third microfluidic conduits having a second orientation relative to the device whereby the first and second microfluidic conduits are configured such that application of a first directional force field effects liquid flow in the first and second conduits but not in the third conduits, and whereby the third microfluidic conduits are configured such that application of a second directional force field effects liquid flow in the third microfluidic conduits but not in the first or second conduits, wherein at least some of the conduits are spatially separated across the Y-axis of the device.

In a further aspect, the invention provides a fluidic device for aliquoting and combinatorial mixing of a number M of first liquid samples with a number N of second liquid samples, the microfluidic device comprising:

first reservoirs for each of the M first liquid samples and second reservoirs for each of the N second liquid samples;

N first aliquot chambers fluidically connected to each of first reservoirs by first microfluidic conduits having a first orientation relative to the device;

M second aliquot chambers fluidically connected to each of the second reservoirs by second microfluidic conduits having a first orientation relative to the device;

at least M times N mixing chambers, in which each mixing chamber is fluidically connected to at least one of the N first aliquot chambers and at least one of the M second aliquot chambers by third microfluidic conduits having a second orientation relative to the device, wherein, the first and second microfluidic conduits are configured such that application of a first unidirectional force field effects liquid flow in the first orientation to generate aliquots of the M first liquid samples in the N first aliquot chambers and N second liquid samples in the M first aliquot chambers.

wherein, the third microfluidic conduits are configured such that application of a second unidirectional force field effects liquid flow in the second orientation to combinatorially combine aliquots of the M first liquid samples with aliquots of the N second liquid samples. wherein at least one of the first reservoirs is fluidically connected to the N first metering chamber in series, and wherein at least some of the conduits are optionally spatially separated across the Y-axis of the device.

The number M may be 1 and preferably is at least 2 or 3. The number N is typically at least 2 or 3. In one embodiment, M is at least 3 and N is at least 3. In one embodiment, M is at least 4 and N is at least 4. M and N may be different numbers, for example, the device of the invention may be configured for combinatorial mixing of 3 samples (first liquid samples) with 4 reagents (second liquid samples). The term liquid sample may refer to any type of liquid, for example a biological fluid, a pharmaceutical sample, a chemical, a reagent or a buffer. The different liquids may also contain the same type of substance, but at a variety of concentrations.

In one embodiment, the aliquot chambers are metering chambers configured to provide metered aliquots of liquid. Methods of providing metered aliquots of liquids are described herein, although it will be appreciated that the aliquot chambers of the invention may or may not provide for metering of liquids. Thus, while the description predominantly refers to metering chambers, it will be appreciated that the term may be replaced in parts or throughout with aliquot chambers.

In one embodiment, at least one of the first reservoirs is fluidically connected to the N first metering chambers in parallel. This means that the metering chambers are directly fluidically connected to the reservoir. In one embodiment, at least one, and ideally all, of the metering chambers are fluidically connected to a fluid sink, typically be means of an overflow mechanism.

In another embodiment, at least one of the first reservoirs is fluidically connected to the N first metering chamber in series (i.e. a metering chamber A is fluidically connected to the reservoir, metering chamber B is fluidically connected to metering chamber A, metering chamber C is fluidically connected to metering chamber B, etc.). In one embodiment, the metering chambers are fluidically connected by means of an overflow mechanism which serves to meter the liquid in the metering chamber. Typically, the overflow mechanism is provided by an outlet in the metering chamber which defines the volume of liquid retained in the metering chamber. This is illustrated in FIG. 5C. In one embodiment, the final metering chamber in the series has an overflow fluidically connected to a waste chamber.

In one embodiment, at least one of the mixing chambers and fluidically connected first and second metering chambers are provided by a single chamber having aliquot or metering regions and a mixing region disposed such that application of the second directional force field effects liquid flow from the aliquot or metering regions to the mixing region. Examples of single metering/mixing chambers are provided in FIGS. 5, 12 and 13.

In one embodiment, the aliquot or metering regions and mixing region are disposed on opposite ends of the single chamber.

In one embodiment, the single chamber has a generally arch-shape, wherein the feet of the arch-shaped chamber comprise the aliquot or metering regions and the apex of the arch-shaped chamber comprises the mixing chamber.

In one embodiment, at least some of the conduits are disposed on a first plane of the device, and at least some of the conduits are disposed on a second plane of the device. This allows the conduits cross each other during the aliquoting/metering step providing Y-axis dimensional bridging, as illustrated in FIG. 4.

In one embodiment, the first conduits (fluidically connecting the first reservoirs with the first metering chambers/regions) are disposed on a first plane of the device, and the second conduits (fluidically connecting the second reservoirs with the second metering chambers/regions) are disposed on a second plane of the device. In one embodiment, the mixing chamber spans the first and second planes of the device.

In one embodiment, at least some of the third conduits are disposed on a first plane of the device, and at least some of the third conduits are disposed on a second plane of the device. This embodiment is useful where the first and second conduits are disposed on the same plane of the device, as it provides for Y-axis dimensional bridging.

In one embodiment, one or more of the conduits has at least one part in one plane of the device and at least a second part in a second plane of the device, and at least one orthogonal component providing fluidic connection between the at least first and second parts.

In another embodiment, at least one of the conduits comprises a distal and proximal part in one plane of the device, and an intermediate part in a second plane of the device, and first and second orthogonal components providing fluidic connection between the distal and proximal, and intermediate, parts of the conduit.

In one embodiment, at least one of the conduits comprises an orthogonal component providing fluidic connection between the conduit and a fluidic chamber (for example a reservoir, aliquoting or metering chamber, or mixing chamber).

In one embodiment, one or more of the first metering chambers are disposed in a first plane of the device and one or more of the second metering chambers are disposed in a second plane of the device.

In one embodiment, one or more of the mixing chambers span the first and second planes of the device.

In one embodiment, at least one of the mixing chambers comprises a trap structure configured to prevent liquid in the mixing chamber returning to the associated metering chambers upon application of the first directional force field. An example of a trap structure is provided in FIG. 16.

In one embodiment, the device comprises a liquid collection chamber fluidically connected the trap structures of the mixing chambers by collection conduits, wherein the collection conduits are configured to force the liquid in the mixing chambers to the collection chamber upon application of a directional force field, for example the first directional force field.

In one embodiment, the device comprises a third reservoir for a third liquid sample, and a conduit configured to deliver an aliquot of the third liquid sample to one or more of the mixing chambers. In one embodiment, the conduit is provided in a third plane of the device. In one embodiment, a pumping mechanism is provided to pump the third liquid sample from the reservoir to the metering/mixing chambers. An example is shown in FIG. 9.

In one embodiment, the first and second conduits are configured to have a higher fluidic resistance compared with the third conduits. Advantageously, this has the effect of throttling liquid flow through the device, and prevents liquid overflowing the metering chambers into the third conduits during application of the first directional force field.

In one embodiment, the first and second conduits are disposed generally laterally with respect to the chip and the third conduits are disposed generally longitudinally with respect to the chip. In one embodiment, in which the directional force field is a rotor-driven centrifugal field, the device is positioned during the metering phase with the third conduits extending generally radially inwards (thus against the direction of the centrifugal force). This prevent movement of out of the metering chambers during the metering operation.

In one embodiment, the metering chambers are arrayed in a diamond configuration (see FIG. 20.1 for example). In one embodiment, the reservoirs and combined metering/mixing chambers are arrayed in a diamond configuration (See FIGS. 20.2 and 20.3). In one embodiment, the reservoirs are disposed on adjacent sides of the diamond array. These embodiments provide a diagonal orientation of first and second conduits, which has been found to meter and transfer fluid as effectively as vertical conduits, and avoids difficulties associated with horizontal conduits. Three different diamond arrays are illustrated in FIG. 20.

In one embodiment, the device is configured to combinatorially mix at least one liquid sample with a second liquid sample in unequal mixing ratios. For example, two volumes of a first liquid sample may be mixed with one volume of a second liquid sample In one embodiment, the device is formed from a microtitre plate (i.e. for example, a common off the shelf 96 well plate) and an attachment for the plate (for example a closing lid) comprising the reservoirs, aliquot/metering chambers, and conduits, wherein the wells of the plate are the mixing chambers.

In one embodiment, the attachment comprises a first region comprising reservoirs configured to receive the first and second liquid samples, and a second region configured to attach to a top of the microtiter plate to close some or all of the wells of the plate. In one embodiment, an underside of the second region comprises a plurality of spouts configured to project into wells of the plate when the device is assembled. In one embodiment, the attachment comprises the aliquot/metering chambers and the first and second conduits providing fluidic connection between the reservoirs and aliquot/metering chambers. In one embodiment, the third conduits provide fluidic connection between the aliquot/metering chamber and the spouts.

In one embodiment, the attachment comprises a third region comprising a plurality of waste chambers configured to receive excess liquids from the aliquot/metering chambers. In one embodiment, the first and third regions are disposed at each end of the attachment, and the second region is disposed between the first and third regions.

In use, the device is assembled and the reservoirs are loaded with liquids, before the device is attached to a rotor, for example a flying bucket rotor centrifuge. The device is offset (i.e. 45 degrees) so that a component of the centrifugal force acts laterally. The device is centrifuged in this position, forcing liquids from the reservoirs into the aliquot/metering chambers. The rotor is then stopped and the device is re-positioned, and a second centrifuge step is carried out which forces liquid from the aliquot/metering chambers into the wells of the microtiter plate through the spouts, where aliquots of the liquids mix.

In this embodiment, the first and second directional force fields can be achieved with a common laboratory flying bucket-type centrifuge.

In one embodiment, the device is a planar device (i.e. chip) having a plurality layers (planes).

In one embodiment, the fluidic device is a microfluidic device.

The invention also provides a method of aliquoting (or metering) and combinatorial mixing of a number M of first liquid samples with a number N of second liquid samples, which method employs a fluidic device according to the invention, the method comprising the steps of:

exposing the fluidic device to a first direction force field whereby an aliquot of the M first liquid samples is forced into the N first aliquoting/metering chambers and an aliquot of the N first liquid samples is forced into the M second aliquoting/metering chambers;

exposing the fluidic device to a second directional force field whereby the aliquots of the first and second liquid samples are forced into the mixing chambers in a combinatorial manner.

In one embodiment, the first and second directional force fields are each, independently, selected from a centrifugal force field and a gravitational force field or a combination of both.

In one embodiment, the first and second directional force fields are generated by changing the orientation of the device in a common directional force field. In one embodiment, reorientation is implemented manually. In one embodiment, reorientation is implemented by changing a characteristic of the directional force field, for example changing the rotational speed or acceleration when the force field is centrifugal. In one embodiment, reorientation of the device is performed using a passive mechanical spring- or magnet-based mechanism, or by an active mechanism (i.e. a mechatronic mechanism).

In one embodiment, the common directional force field is selected from a centrifugal force field and gravity, wherein the method includes the steps of disposing the device in a first orientation in the common directional force field to generate the first directional force field, and then disposing the device in a second orientation in the common directional force field to generate the second directional force field.

In one embodiment, the first liquid samples are biological samples and the second liquid samples are reagents.

Other aspects and preferred embodiments of the invention are defined and described in the other claims set out below.

BRIEF DESCRIPTION OF THE FIGURES

FIGS. 4C to 4E illustrates how the circular mixing region of the metering/mixing chamber spans the three layers of FIGS. 4C to 4E, and one metering chamber is disposed in the layer of FIG. 4C and one is disposed in the later of FIG. 4E, which ensures that the metered aliquots in the metering chambers are kept separate until a second directional force is applied which forced the respective aliquots towards the mixing region where they combine. The layer of FIG. 4F contains the second conduits providing fluidic connection between the second reservoirs and metering/mixing chambers.

FIG. 5A illustrates the liquid samples loaded into the reservoirs, FIG. 5B illustrates the metering of the liquid samples into aliquots in the metering chambers with the chip in the first orientation with respect to the rotor, whereby the centrifugal force causes the liquid samples to move in a first direction towards the metering chambers, and FIG. 5C shows the mixing step where the chip is reoriented into a second orientation (rotated through 180 degrees) whereby the centrifugal force causes the liquid samples to move in a second direction from the metering chambers to the mixing chamber. In this embodiment, each of the mixing chambers, and associated metering chamber, are provided by a single combined metering/mixing chamber having an inverted V-shape and metering pockets and an opposed mixing pocket. successful mixing occurred. In some cases, due to manufacturing flaws, less liquid than desired was metered and a dominant colour can be seen (red or green).

FIGS. 8A to 8D illustrates liquid flow in response to the first directional force filed, where an aliquot of a first liquid sample and second liquid sample is forced into the metering pockets of the metering/mixing chamber where the overflow outlets allow excess fluid to leave the metering pockets (FIG. 8C) leaving a metered aliquot of the respective fluids (FIG. 8D). The device is then re-oriented with respect to the direction of the centrifugal field whereby the centrifugal forces (second directional force field) forces the liquids in the metering pockets into the mixing pocket (FIGS. 8E and 8F).

FIG. 19A shows a first layer of the device and the first conduits providing fluidic connection from the six central reservoirs to 24 metering chambers. FIG. 19B shows a second layer of the device and the second conduits providing fluidic connection from the four outermost reservoirs to 24 metering chambers.

DETAILED DESCRIPTION OF THE INVENTION

Figure 1:
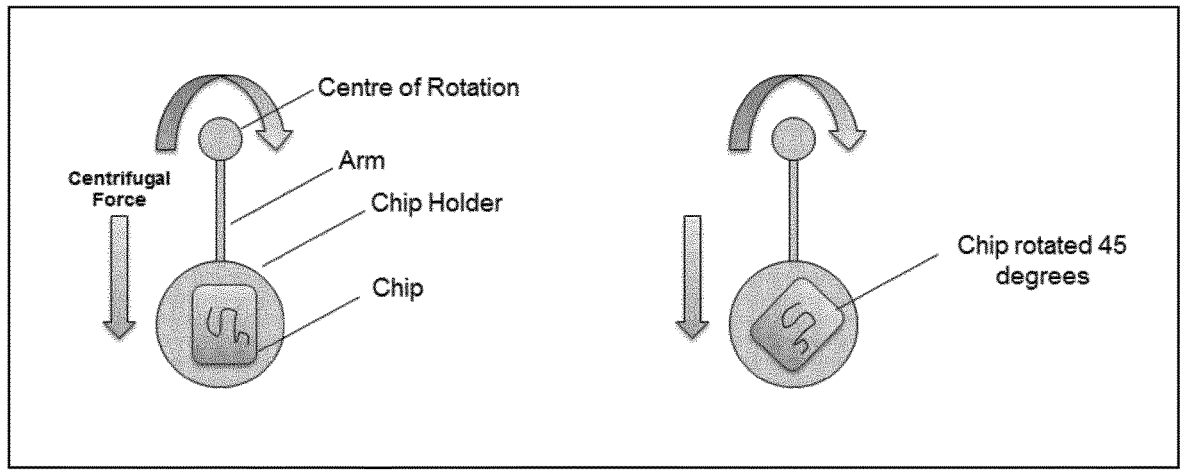
FIG. 1 illustrates how different centrifugal forces can be applied to the chip by reorienting the chip with respect to the centrifugal force. In this case the chip is rotated through 45 degrees.

All publications, patents, patent applications and other references mentioned herein are hereby incorporated by reference in their entireties for all purposes as if each individual publication, patent or patent application were specifically and individually indicated to be incorporated by reference and the content thereof recited in full.

Definitions and General Preferences

Where used herein and unless specifically indicated otherwise, the following terms are intended to have the following meanings in addition to any broader (or narrower) meanings the terms might enjoy in the art:

Unless otherwise required by context, the use herein of the singular is to be read to include the plural and vice versa. The term "a" or "an" used in relation to an entity is to be read to refer to one or more of that entity. As such, the terms "a" (or "an"), "one or more," and "at least one" are used interchangeably herein.

As used herein, the term "comprise," or variations thereof such as "comprises" or "comprising," are to be read to indicate the inclusion of any recited integer (e.g. a feature, element, characteristic, property, method/process step or limitation) or group of integers (e.g. features, element, characteristics, properties, method/process steps or limitations) but not the exclusion of any other integer or group of integers. Thus, as used herein the term "comprising" is inclusive or open-ended and does not exclude additional, unrecited integers or method/process steps.

As used herein, the term "disease" is used to define any abnormal condition that impairs physiological function and is associated with specific symptoms. The term is used broadly to encompass any disorder, illness, abnormality, pathology, sickness, condition or syndrome in which physiological function is impaired irrespective of the nature of the aetiology (or indeed whether the aetiological basis for the disease is established). It therefore encompasses conditions arising from infection, trauma, injury, surgery, radiological ablation, poisoning or nutritional deficiencies.

As used herein, the term "fluidic device" means a device having a plurality of different chambers for containing fluids and fluidic channels providing fluid communication between the chambers. The fluidic device may be a microfluidic device. The fluidic device is typically a planar device. Examples of planar devices include disks, chips and microtitre plates. The fluidic device may comprise a plurality of layers, for example 2, 3, 4, 5, 7, 8, 9 or 10. The fluidic device may comprise reservoirs for fluids. The reservoirs may comprise apertures for filling of the reservoirs with fluid. At least one of the fluidic channels may include a valving mechanism operable to open and close the fluidic channel. Various types of valving mechanisms may be employed, examples of which are described in the literature referenced herein. The term also includes microtitre plates having a plurality and generally a multiplicity of wells, having an associated structure (for example a lid) which provides fluidic channels configured to connect the wells of the plate to provide a device of the invention. This embodiment of the invention is described in more detail below. The fluidic device of the invention may be configured for rotary motion on a rotary device. When the device is a disk, it may have a central aperture (or other connection means) for mounting on a turntable. When the device is a chip, it may be configured for mounting on a planetary rotation device, typically in at least two different configurations. The fluidic device may be performed for any method of procedure requiring combinatorial mixing of liquids including PCR amplification of nucleic acids (for example thermal or isothermal amplification), arraying of nucleic acids, assaying of chemical or drug libraries (for example to detect interactions between drugs and ligands), combinatorial chemistry, screening libraries of chemical or biological materials, immunochemical reactions and the like. In one embodiment, the device is configured for genotyping samples, especially PCR-based genotyping. In one embodiment, the device is configured for nucleic acid screening for pharmacogenomic or chemotherapeutic screening, for example. In one embodiment, the device is configured for nucleic acid microarray hybridisation. In one embodiment, the device is configured for screening or monitoring of environmental samples. In one embodiment, the device is configured for LAMP amplification of nucleic acid.

As used herein, the term "microfluidic device" means a device comprising at least one microfluidic channel typically having a diameter of less than 1000 microns. The term includes devices configured to perform continuous flow microfluidics, droplet based microfluidics, digital microfluidics, and for application in nucleic acid arrays and immunoassays for clinical and research applications. Typically, the device comprises a plurality of microfluidic channels, one or more reservoirs for liquids, and one or more metering and mixing chambers. In one embodiment, the microfluidic device is a passive device, in which fluid transport on the chip is effected by means of an external force (for example rotary drives applying centrifugal forces). In one embodiment, the device may comprise active micro-components such as micropumps. In one embodiment, the microfluidics device may be configured to provide for both active and passive transport of fluids within the device. Microfluidics devices are well known in the literature, and are described in WO2012/164086, U.S. Pat. No. 6,719,682, US2009/166562, WO2006/044841, and US2006/078462. In one embodiment, the microfluidic device is configured to perform a polymerase chain reaction (PCR). In one embodiment, the microfluidic device is configured to perform an enzyme linked immunosorbent assay (ELISA).

As used herein, the term "combinatorial mixing" refers to mixing each first sample with each second sample. Thus, where the device is configured to combinatorially mix three first liquids A, B and C with three second liquids 1, 2 and 3, combinatorial mixing provides 9 pairwise combinations, namely A1, A2, A3, B1, B2, B3, C1, C2 and C3.

As used herein, the term "metering" or "aliquoting" as applied to a liquid sample refers to generating aliquots of the liquid sample. In one embodiment, a liquid sample is divided into aliquots of equal volume. In one embodiment, a liquid sample is divided into aliquots of unequal volume. In one embodiment, at least 2, 3, 4, 5, 6, 7, 8, 9 or 10 aliquots of a liquid sample are provided. As used herein, the term "metering" refers to providing aliquots of defined volume.

As used herein, the term "spatially separated across the Y-axis of the device" as applied to the conduits should be understood to mean that at least a part of some of the conduits are provided on one plane of the device and at least part of other conduits are provided on a second plane of the device, allowing the conduits to cross-over without intersecting by means of Y-axis spatial separation. In one embodiment, some of the conduits may be provided on one plane of the device and other conduits are provided on a second plane of the device. Thus, for example, the first conduits may be provided on one plane of the device and the second conduits may be provided in second plane of the device. This latter embodiment is useful when combined aliquoting/mixing chambers are employed, where a first aliquoting chamber is disposed in one plane of the device and a second aliquoting chamber is disposed in a second plane of the device (i.e. FIG. 4). In another example, some of the third conduits may be provided on a first plane of the device and some of the third conduits may be provided on a second plane of the device. This embodiment is useful where the aliquoting step does not require crossing of conduits (i.e. FIG. 9). In another embodiment, at least some of the conduits may have at least one part in one plane of the device and at least a second part in a second plane of the device, and at least one orthogonal component providing fluidic connection between the at least first and second parts. In another embodiment, at least one of the conduits comprises a distal and proximal part in one plane of the device, and an intermediate part in a second plane of the device, and first and second orthogonal components providing fluidic connection between the distal and proximal, and intermediate, parts of the conduit. In one embodiment, at least one of the conduits comprises an orthogonal component providing fluidic connection between the conduit and a fluidic chamber (for example a reservoir, aliquoting or metering chamber, or mixing chamber). In one embodiment, one or more of the reservoirs, aliquoting, or mixing chambers may extend between different planes of the device.

As used herein, the term "orthogonal" as applied to a conduit or part of a conduit refers to a conduit or part thereof that extends out of the plane of the device, and in one embodiment extends generally perpendicular to a plane of the device. Orthogonal conduits, or orthogonal parts of conduits, are sometimes referred to in the art as "vertical vias" as they extend in the vertical (Y-axis) direction of fluidic chips/devices.

As used herein, the term "liquid sample" refers to any liquid sample, including samples of biological material, chemical samples, pharmaceutical samples, chemical reagents, environmental samples. Biological reagents can include cells, cellular extracts or fractions, nucleic acids (i.e. DNA or RNA based nucleic acids), proteins, carbohydrates, antibodies, lipids, metabolites and the like. Pharmaceutical samples can include drugs, libraries of drugs, drug metabolites, drug candidates, libraries of chemicals obtained by combinatorial chemistry. Chemical reagents can include reagents involved in diagnostic assays, for example antigens, antibodies, diagnostic reagents, and chemicals involved in nucleic acid amplification including polymerase enzymes and nucleotides. In one embodiment, the liquid samples include nucleic acid amplification (i.e. PCR) reagents, for example nucleic acid polymerase enzymes, nucleotides, primers, and probes. "First liquid sample(s)" refers a set of liquid samples, generally of the same type (i.e. different biological samples) that is to be combinatorially mixed with the second liquid samples. "Second liquid sample(s)" refers a set of liquid samples, generally of the same type (i.e. different diagnostic reagents) that is to be combinatorially mixed with the first liquid samples. Examples of liquid samples include nucleic acids, primers, fluorescent probes.

As used herein, the term "reservoir" means a chamber configured to hold a reservoir of the first or second liquid samples. Generally, each of the first and second liquid samples has a dedicated reservoir. Each reservoir has an outlet fluidically connected to a metering chamber (where the metering chamber are provided in series), or a plurality of metering chambers (where the metering chambers are provided in parallel). In one embodiment, first reservoirs and second reservoirs are provided in different planes of the device. In one embodiment, first and/or second reservoirs extend through different planes of the device.

As used here, the term "M" is a whole number that refers to the number of first liquid samples to be combinatorially mixed with the second liquid samples. Typically, M is at least 2, and ideally at least 3, 4, 5, 6, 7, 8, 9, or 10. As used here, the term "N" is a whole number that refers to the number of first liquid samples to be combinatorially mixed with the second liquid samples. Typically, M is at least 2, and ideally at least 3, 4, 5, 6, 7, 8, 9, or 10.

As used herein, the term "aliquot chamber" refers to a chamber configured to hold an aliquot of a first or second liquid sample, that is fluidically connected (directly or indirectly) to a (typically only one) reservoir and fluidically connected to a (typically only one) mixing chamber. In one embodiment, the aliquoting chamber is configured for metering a liquid sample (i.e. "metering chamber"). In one embodiment, the metering means comprises an overflow arrangement. In one embodiment, one or more of the aliquoting/metering chambers are provided in one plane of the device and one or more aliquoting/metering chamber are provided in a second plane of the device.

As used herein, the term "conduit" refers to a passageway configured to provide fluid communication between one location (i.e. a reservoir) and a second location (i.e. a metering chamber). In one embodiment, at least one or more of the conduits are microfluidic conduits. In one embodiment, all of the conduits are microfluidic conduits. Typically, first conduits are provided between the first reservoirs and first aliquoting/metering chambers (or between adjacent aliquoting/metering chambers when they are aligned in series) and typically second conduits are provided between the second reservoirs and second aliquoting/metering chambers (or between adjacent aliquoting/metering chambers when they are aligned in series). The first and second conduits may be disposed in different planes of the device to allow cross-over of the conduits). Typically, third conduits are provided between aliquoting/metering chambers and mixing chambers. Some of the third conduits may be disposed in one plane of the device and other third conduits may be disposed in a second plane of the device.

As used herein, the term "mixing chamber" refers to a chamber configured to hold an aliquot of a first liquid sample and an aliquot of a second liquid sample and combine the samples when the chip is exposed to the second directional force field. In one embodiment, the mixing chambers are remote from the aliquoting/metering chambers and connected by means of conduits, especially microfluidic conduits. In one embodiment, one or more of the mixing chambers extends between at least two planes of the device. In one embodiment, M*N mixing chambers are provided. In one embodiment, the or each mixing chamber is configured to receive an aliquot of a first liquid sample and an aliquot of a second liquid sample. Thus, N*M combinations of aliquots is provided.

Figure 16:
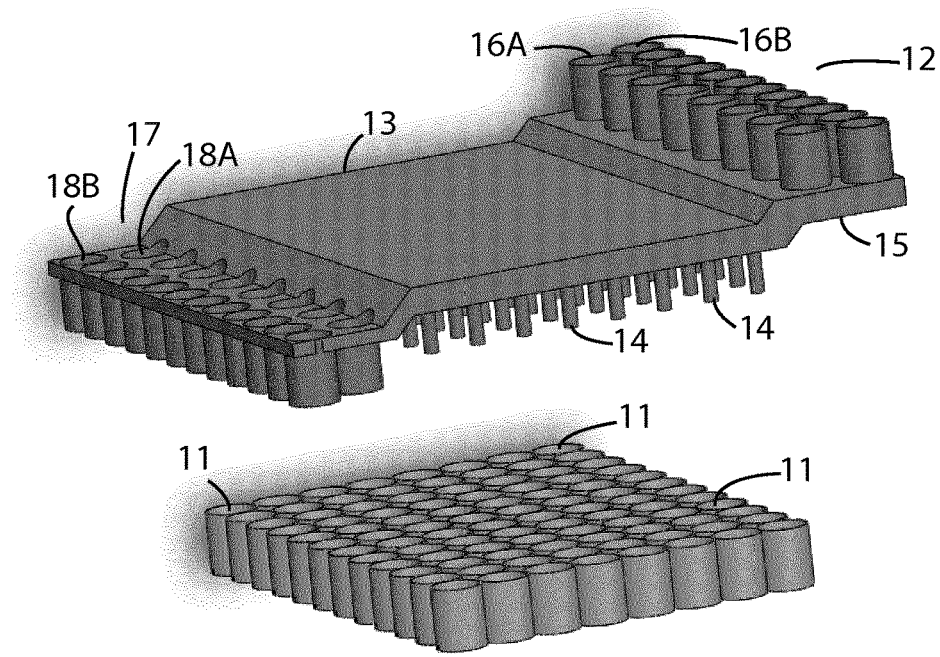
FIG. 16 illustrates an embodiment of the microfluidic chip of the invention comprising a microtiter plate and an attachment for the plate

As used herein, the term "trap" (or "non-return valve" or "non-return structure") as applied to a mixing chamber refers to a configuration of mixing chamber that prevents the mixed aliquots being returned to the metering chambers when the device is exposed to the first directional force field. An embodiment of a mixing chamber with a trap is shown in FIG. 16, although different embodiment will be apparent to a person skilled in the art.

As used herein, the term "first orientation relative to the device" as applied to the first and second conduits refers to a configuration of the conduits that permits fluid flow in the conduits from the reservoir to the metering chambers when the device is exposed to the first directional force field. Likewise, the term "second orientation relative to the device" as applied to the third conduits refers to a configuration of the conduits that permits fluid flow in the conduits from the metering chambers to the mixing chambers when the device is exposed to the second directional force field.

As used herein, the term "in parallel" as applied to a reservoir means that reservoir is directly fluidically connected to each of the N first aliquoting/metering chambers.

As used herein, the term "in series" as applied to a reservoir means that an aliquoting/metering chamber A is fluidically connected to the reservoir, metering chamber B is fluidically connected to aliquoting/metering chamber A, aliquoting/metering chamber C is fluidically connected to aliquoting/metering chamber B, etc.), providing a cascading flow of liquid from the reservoir to the metering chambers. In one embodiment, the metering chambers are fluidically connected by means of an overflow mechanism which serves to meter the liquid in the metering chamber. Typically, the overflow mechanism is provided by an outlet in the metering chamber which defines the volume of liquid retained in the metering chamber. This is illustrated in FIG. 5C. In one embodiment, the final metering chamber in the series has an overflow fluidically connected to a waste chamber.

As used herein, the term "single chamber" or "metering/mixing chamber" (or "aliquoting/mixing chamber") refers to an embodiment of the device in which at least one mixing chamber (and associated aliquoting/metering chambers) is provided a single chamber having two aliquoting/metering regions and one mixing region. Metering/mixing chambers are illustrated in FIGS. 4, 5, 12 and 13. The device of FIG. 4 has an arched-type structure (for example a U-shape or V-shape), with two feet comprising the metering regions, and an apex comprising the mixing region. In one embodiment, the metering regions and mixing region are spaced-apart. In one embodiment, the metering/mixing chamber is disposed in one plane of the device. In another embodiment (see FIG. 12 as an example), one metering chamber is disposed in one plane of the device and another metering chamber is disposed in another plane of the device, and the mixing chamber typically extends between the two planes. This embodiment, allows the fluidic architecture feeding a first set of metering chambers (i.e. N metering chamber) be disposed in one plane of the device and the fluidic architecture feeding the second set of metering chamber (i.e. M metering chambers) be disposed in a second plane of the device, which in turn allows the conduits cross each other.

As used herein, the term "directional force field" refers to a force that the device is subjected to that, in use, causes one or more of the fluids in the device to move. Examples include force fields generated my movement of the device (i.e. centrifugal force fields, inertia force field) or force fields that do not require movement of the device (i.e. gravity). Examples include centrifugal force fields, gravity, a force field generated by pressure changes (or pressure gradients) in the liquids, a force field generated by temperature changes (or temperature gradients) in the liquids, mechanical pump generated force fields. In a preferred embodiment, the directional force field is selected from a centrifugal or gravity based force field. In one embodiment, the first directional force field is one type of force field (i.e. centrifugal) and the second directional force field is a second type of force field (i.e. gravity). In one embodiment, both the first and second force field are of the same type (i.e. gravitational force fields). In one embodiment, the first and second directional force fields are the same force field, where re-orientation of the device with respect to the force field causes the device to be exposed to different directional force fields. In one embodiment, the directional force field is a centrifugal force field.

The device of the invention, or the layers of the device, may be formed from a suitable polymeric material, for example a thermoplastic resin. Examples of thermoplastic resins include cyclic olefin copolymers, polymethylmethacrylate, polycarbonate, polystyrene, polyoxymethylene, perfluoralkoxy, polyvinylchloride, polypropylene, polyethylene terephthalate, polyetheretherketone, polyamide, polysulphone, and polyvinylidine chloride. The device may be a planar device, of any shape. The device may comprise a layered structure, in which the layers are optionally adhered together with adhesive, for example a pressure sensitive adhesive. In one embodiment, at least some of the layers may be formed from polymethylmethacrylate (PMMA). The structures formed on the device (i.e. the conduits, reservoirs, etc.) may be formed in any manner—exemplary methods include use of a knife-cutting machine or $CO^2$ laser cutting. In one embodiment, each layer of the device has a thickness of 0.1 to 10 mm, preferably 0.1 to 5 mm, more preferably 0.5 to 5 mm.

Exemplification

The invention will now be described with reference to specific Examples. These are merely exemplary and for illustrative purposes only: they are not intended to be limiting in any way to the scope of the monopoly claimed or to the invention described. These examples constitute the best mode currently contemplated for practicing the invention.

The centrifugal microfluidic chip claimed uses the principle of directing liquid about the cartridge based on a re-orientation of the disc in a directed force field. While (terrestrial) gravity and similar directional fields may be employed, we describe here a mechanism based of the rotationally induced centrifugal field for the sake of clarity. From the state-of-the-art, it is evident where the centrifugal field may be replaced, either entirely of for parts of the proposed methods, by other density dependent, unidirectional fields.

Figure 2:
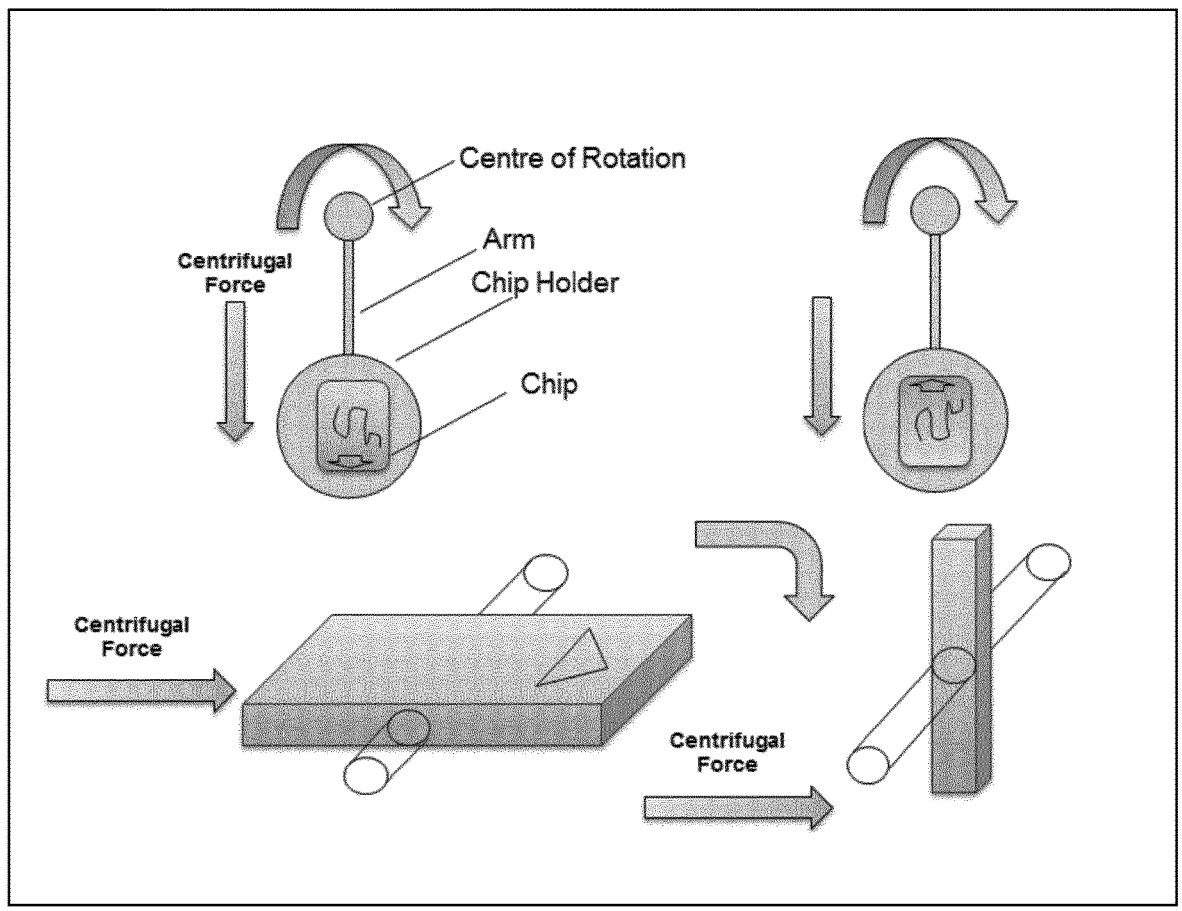
FIG. 2 illustrates how different centrifugal forces can be applied to the chip by reorienting the chip with respect to the centrifugal force. In this case the chip is rotated about an axis that runs perpendicular to the direction of the centrifugal force.
Figure 3:
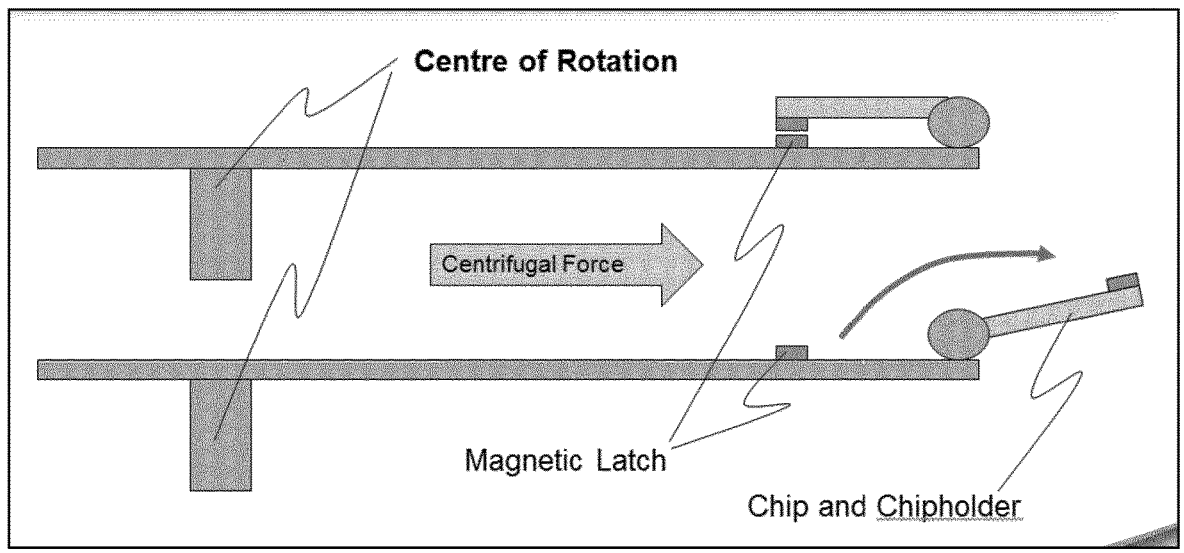
FIG. 3 illustrates a mechanism for re-orienting the chip based on varying the centrifugal force. Initially the chip is held in location by a magnetically based latch. Following the first centrifugation, increasing the centrifugal force overcomes the magnetic force and the chip flips about its axis. This re-directs the centrifugal force relative to the chip orientation. Note this could also be implemented through an external input to open the latch, by incorporating a spring in the axis or by other means.

This orientation of the field can be by means of rotation (FIG. 1), e.g. by 180 to achieve a complete reversal of the initial force field (FIG. 2). This re-orientation can, for example, be achieved by means of a secondary spindle motor, by means of changing the centrifugal force to action a spring or to open a latch (FIG. 3). Similarly, this change in orientation can take place when the cartridge is in motion or by first stopping the rotor, re-orienting the cartridge and resuming the spinning. When the centrifuge is stopped, the chip may be devised by principles know to the expert in the field so forces induced by surface or interfacial tension surface which tend to dominate towards the small length scales in microfluidics retain the liquid elements in their collection pockets until another body force, e.g. induced by a subsequent centrifuge step, is applied. In another teaching the cartridge can be manually repositioned before the second centrifugation step (i.e. FIG. 7).

Figure 4:
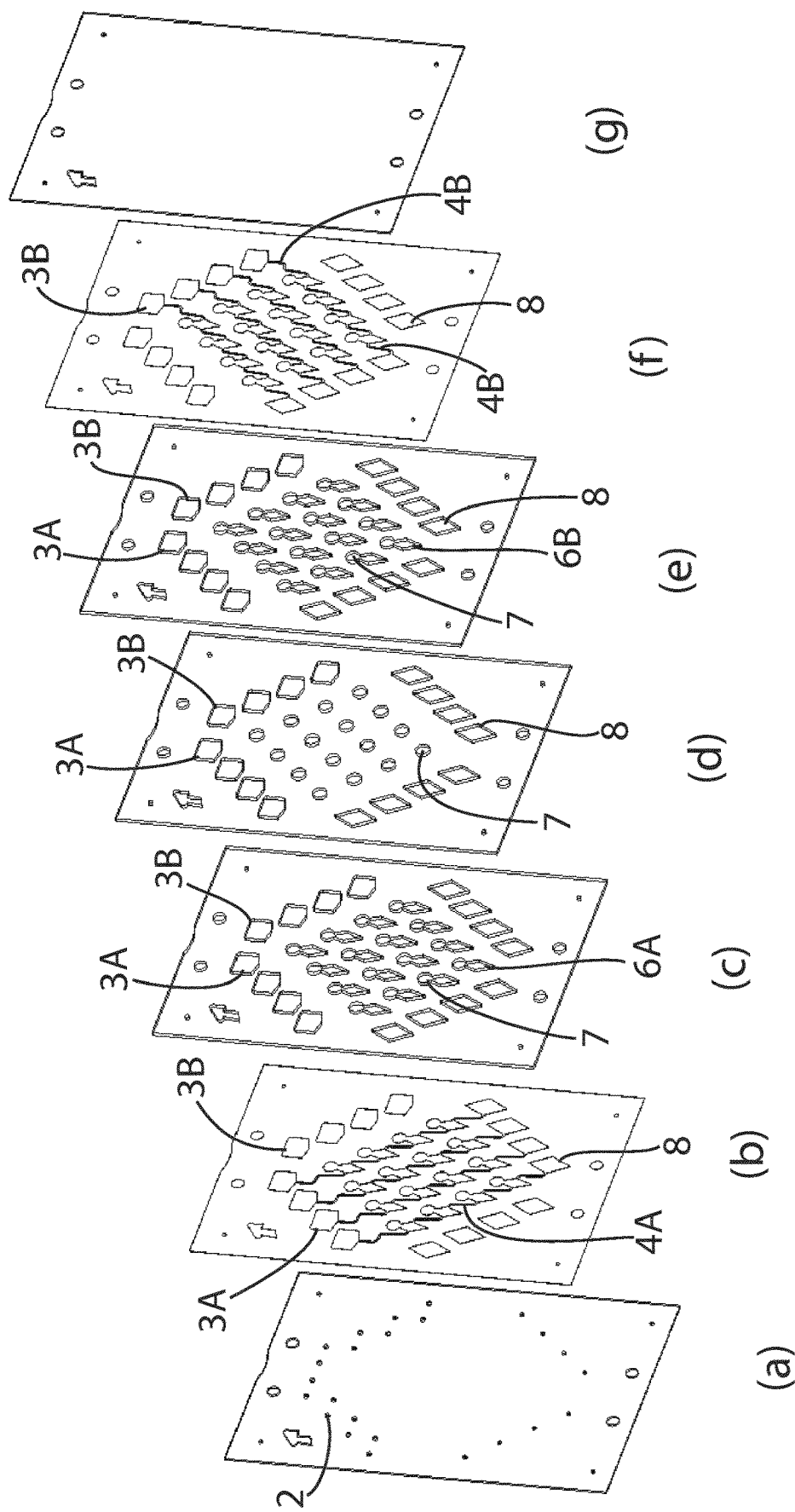
FIG. 4 illustrates a chip according to the invention that is configured for pairwise combinatorial mixing of four first liquids with four second liquids. The chip is shown in an expanded view illustrating the different layers of the device and the separation of the first and second conduits into different layers of the device (Y-axis dimensional bridging). The layers of FIGS. 4A and 4G are front and rear cover layers, respectively, the front cover having apertures for filling the reservoirs. The layer of FIG. 4B contains the first conduits providing fluidic connection between the first reservoirs and mixing chambers. This figures also illustrates how each reservoir is fluidically connected to four metering/mixing chambers in series by means of an overflow mechanism.
Figure 5:
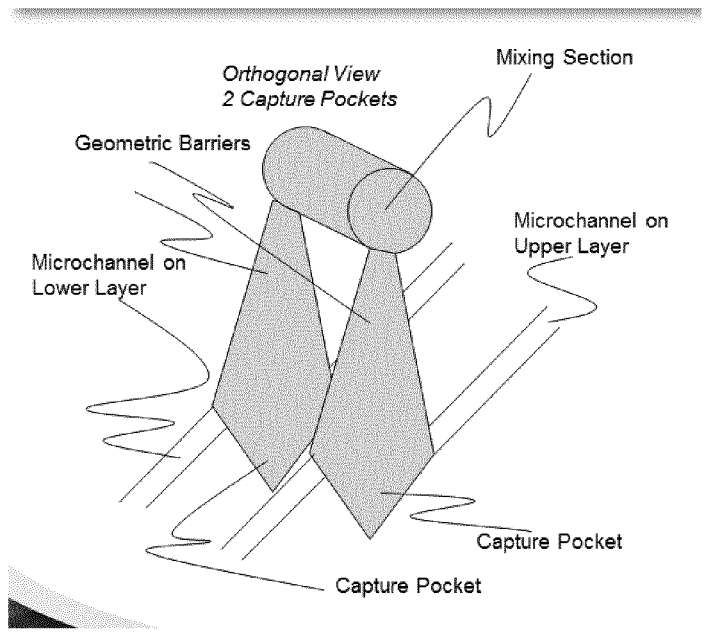
FIG. 5 illustrates a combined metering/mixing chamber forming part of the microfluidic chip of FIG. 4, in which the first metering region is disposed in a first plane of the device, the second metering region is disposed in a second plane of the device, and the mixing region spans the first and second planes.

Referring to FIGS. 4 and 5, one embodiment of a microfluidic device (chip) of the invention is described in detail. The chip is shown in an expanded view illustrating the different layers of the device and the separation of the first and second conduits into different layers of the device (Y-axis dimensional bridging). The layers of FIGS. 4A and 4G are front and rear cover layers, respectively, the front cover having apertures 2 for filling the first reservoirs 3A and second reservoirs 3B. The layer of FIG. 4B contains the first conduits 4A providing fluidic connection between the first reservoirs 3A and combined metering/mixing chambers 5. The layer of FIG. 4F contains the second conduits 4B providing fluidic connection between the second reservoirs 3B and metering/mixing chambers 5. Each metering/mixing chamber 5 has a first metering region 6A in one layer (FIG. 4B) in fluid communication with the first conduits 4A, a second metering region 6B in a second layer (FIG. 4F) in fluid communication with the second conduits 4B, and a mixing chamber 7 which spans the layers of FIGS. 4B to 4F. Each reservoir is connected to a four metering mixing chambers, arranged in series and connected by means of overflow mechanisms which serve to meter a defined aliquot of liquid into the metering regions of each metering/mixing chamber. The last metering/mixing chamber is fluidically connected to an outlet chamber 8. FIGS. 4C to 4E illustrates how the circular mixing region of the metering/mixing chamber spans the three layers of FIGS. 4C to 4E, and one metering chamber is disposed in the layer of FIG. 4C and one is disposed in the later of FIG. 4E, which ensures that the metered aliquots in the metering chambers are kept separate until a second directional force is applied which forced the respective aliquots towards the mixing region where they combine.

Referring to FIG. 5, a combined metering/mixing chamber of the type employed in the microfluidic chip of FIG. 4 is illustrated in more detail in which parts identified with reference to FIG. 4 are assigned the same reference numerals. The orthogonal view provided illustrates how the metering regions 6A and 6B of the metering/mixing chamber 5 are provided in different planes (layers) of the chip, which allows for Y-axis dimensional bridging of the conduits 4A and 4B. This figure also illustrates the overflow mechanism that is provided for metering a defined aliquot into each metering chamber and allowing the first metering regions and second metering regions to be connected in series. The metering region (capture pocket) is defined by the position of the outlet (overflow) conduit.

Figure 6:
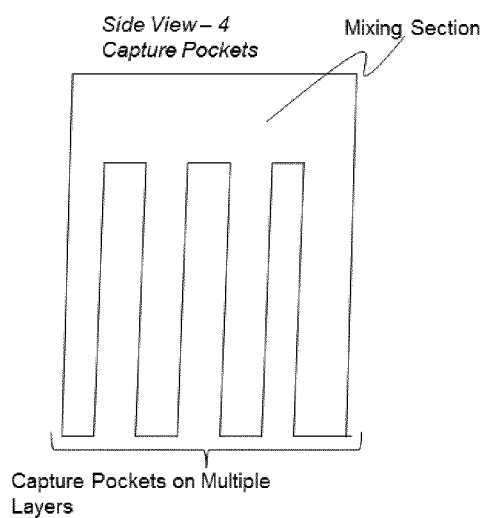
FIG. 6 illustrates a combined metering/mixing chamber similar to the embodiment of FIG. 5 but having four metering pockets.

FIG. 6 illustrates an alternative embodiment of a metering/mixing chamber that is similar to that of FIG. 5 but comprises four metering regions separated along the Y-axis of the chip and a common mixing chamber which spans the Y-axis of the device.

Figure 7:
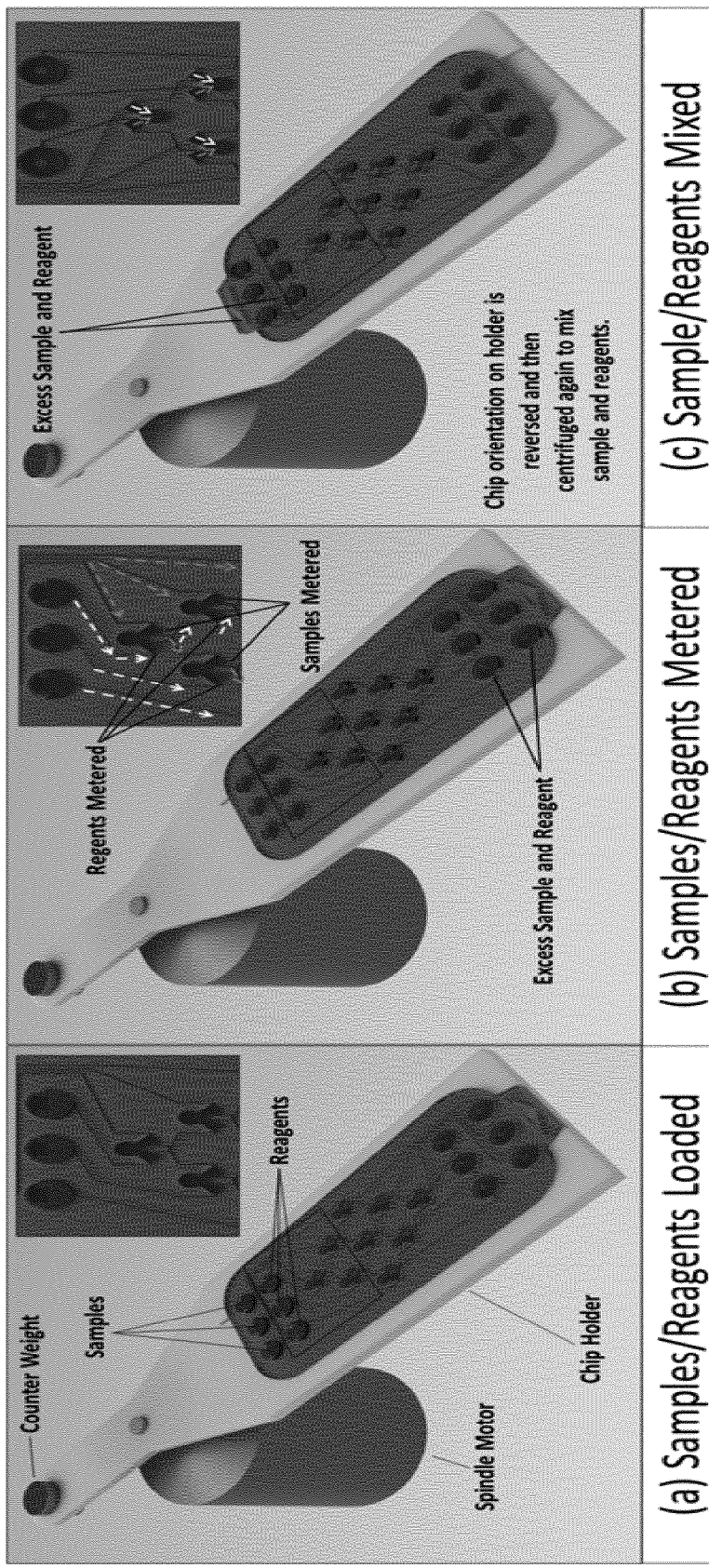
FIG. 7 illustrates a chip according to the invention that is similar to the chip of FIG. 4 but is configured for pairwise combinatorial mixing of three first liquids with three second liquids and includes arch-shaped metering/mixing chambers (illustrated in more detail in FIG. 8). The chip is mounted on an arm.
Figure 8:
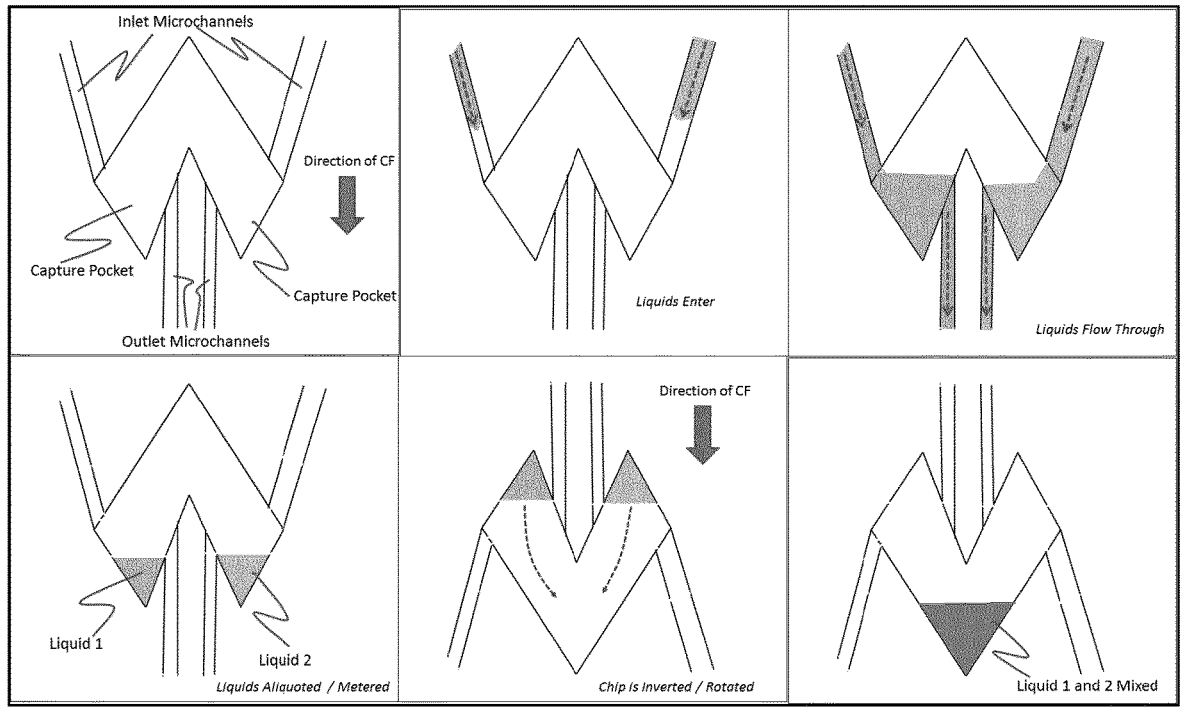
FIG. 8 illustrates in more detail the combined metering/mixing chamber forming part of the chip illustrated in FIG. 7.

Referring to FIGS. 7 and 8, an alternative embodiment of the invention is described which is similar in construction to the chip described with reference to FIG. 4. In this embodiment, three first liquids (samples) are combinatorially mixed with three reagents (second liquids). Although not illustrated, the device has a similar layered structure to the device of FIG. 4, where the first conduits and second conduits are provided on different layers of the device, providing Y-axis dimensional bridging. The chip is shown mounted on the arm of a planetary rotor device configured to rotate the arm and expose the chip to a centrifugal force field. FIG. 7A shows the samples and reagents being added to the six reservoirs. FIG. 7B shows the metering of the samples and reagents into the metering regions of the metering/mixing chambers, due to rotation of the arm and resultant centrifugal force being exerted on the chip. In FIG. 7C, the chip has been re-positioned on the arm (rotated about 180 degrees) so that the centrifugal force exerted, relative to the chip, is reversed, and this causes aliquots of sample and reagent to be forced into the mixing regions of the metering/mixing chambers.

The combined metering/mixing chambers of this device are different to those described previously, and are described in detail in FIG. 8. The combined metering/mixing chamber of this embodiment, is an arch-shaped device having legs which provide metering regions (capture pockets) and an apex which provides a mixing region. Application of the first directional force field (FIG. 7B) forces sample and reagent into the respective metering regions, and application of the second directional force field (FIG. 7C) forces sample and reagents from the metering regions into the mixing regions.

In the foregoing embodiments, combinatorial mixing can be achieved using a centrifugally driven microfluidic chip. In one exemplary configuration, a chip features a plurality of M inlets for a reagent (P) of one type, and a number of inlets (N) for a reagent of a second type (S). Centrifuging the chip will pump P and S through the chip such that a defined volume of P and S is metered in each captured chamber. The individual defined volumes of P and S are prevented from mixing via a geometric barrier. By their length or cross section, the hydrodynamic resistances of the microchannels between the loading chambers and the mixing chambers are designed to prevent the reagents overflowing the geometric barriers during this metering step (FIGS. 4 and 7). Following the first centrifugal aliquoting step, re-orientating the chip in the centrifugal field drives the liquid into a section of each mixing chip where they can mix.

Figure 9:
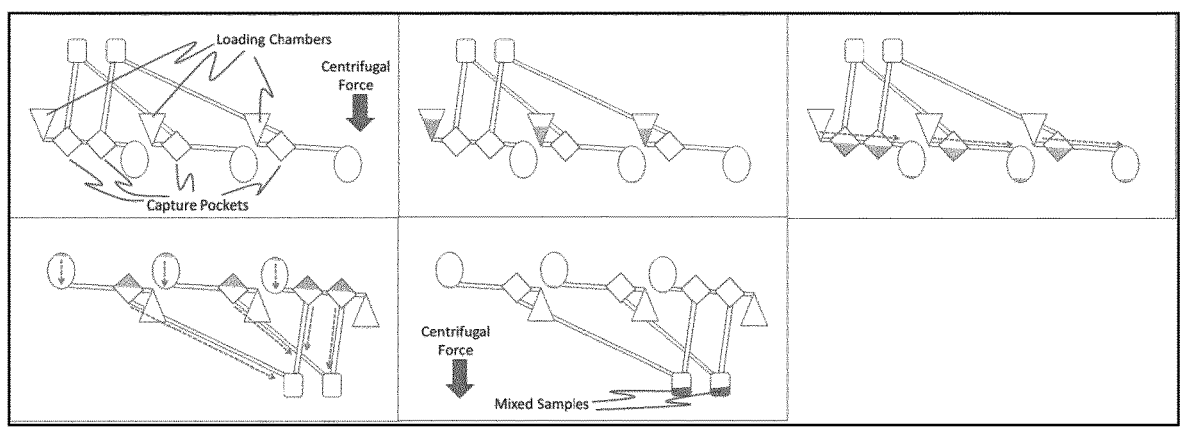
FIG. 9 illustrates an embodiment of the invention having separate metering and mixing chambers. In this case the mixing chambers are extended so that, during the first centrifugation, the geometric barriers extend radially inwards of the loading chambers. In the confirmation shown here the design will array 1 liquid with 2 liquids.

Referring to FIG. 9, there is illustrated an alternative embodiment of the microfluidic device of the invention. In this embodiment, the device is configured to combinatorially mix one sample (first liquid) with two reagents (second liquids). In this embodiment, separate metering and mixing chambers are provided, and the third conduit providing fluidic connection between the metering and mixing chambers extends generally radially inwardly with respect to the rotor when the device is in the first orientation with respect to the rotor, ensuring that liquid does not overflow the metering chambers and flow into the mixing chambers when the first directional (centrifugal) force is applied. In this embodiment, one first liquid is metered from a first reservoir (loading chamber) into two adjacent metering chamber (capture pockets), and two second liquids are metered into metering chambers (capture pockets) by the application of centrifugal force in a first direction. The position of the device with respect to the centrifugal field is then reversed, which causes the first and second liquids in the capture pockets to move radially inward towards the mixing chambers, where the liquids combine.

Figure 10:
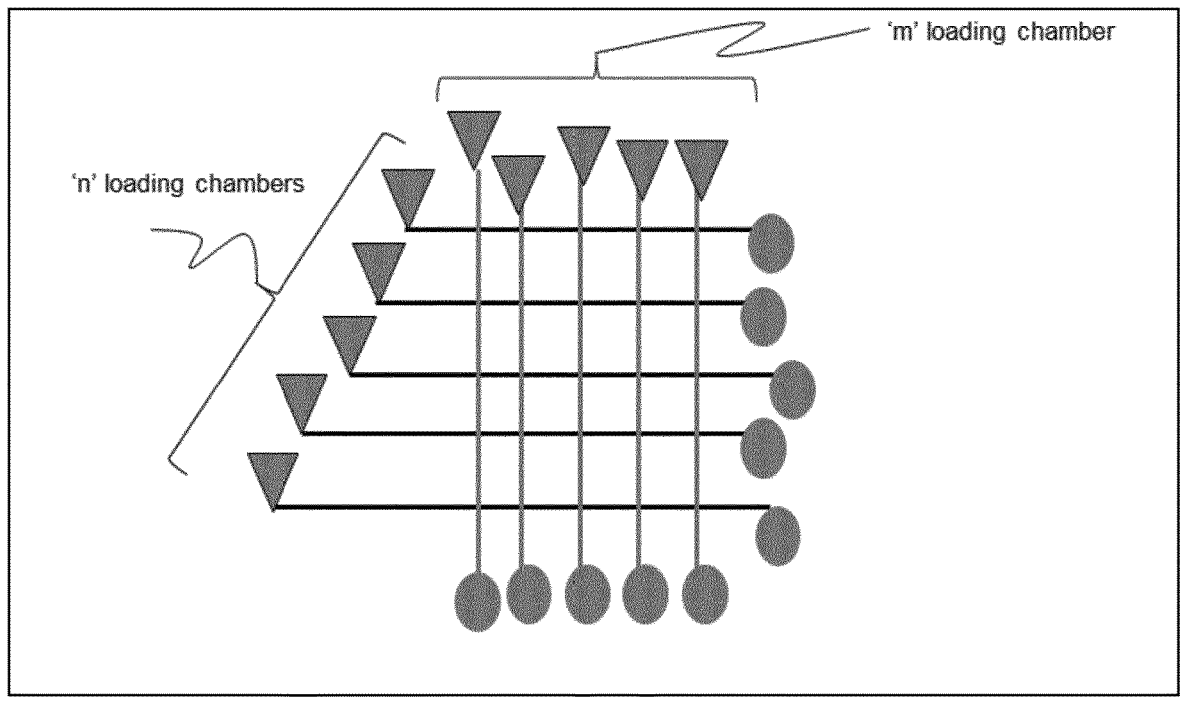
FIG. 10 illustrates one embodiment of a microfluidic device of the invention in which mixing chambers are present where the lines (representing microchannels) intersect.
Figure 11:
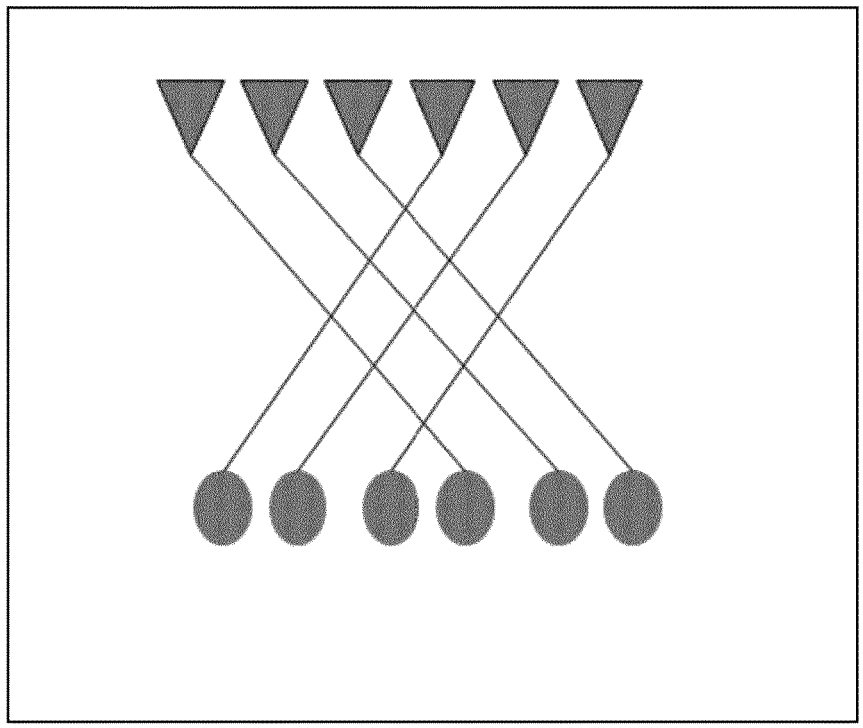
FIG. 11 illustrates another embodiment of a microfluidic device of the invention in which mixing chambers are present where the lines (representing microchannels) intersect.
Figure 12:
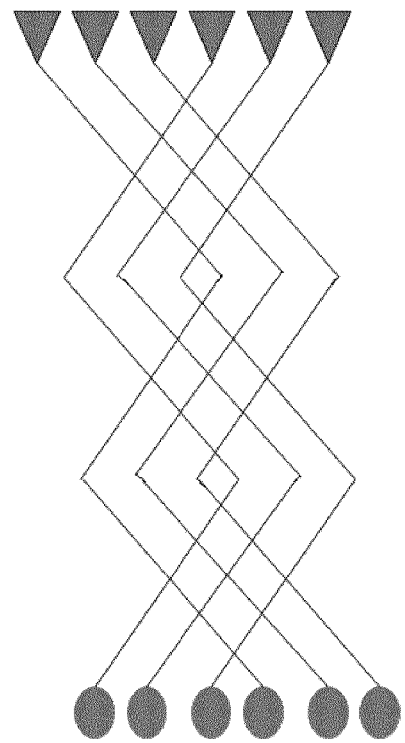
FIG. 12 illustrates another embodiment of the microfluidic device of the invention configured to provide multiple aliquots of the same pairwise combinatorial mixture of first and second liquids.

The architecture of the chip to enable mixing of M aliquots of one reagent with N aliquots of another can take a number of configurations. For example, one set of linking channels might be predominately vertical and the other predominantly horizontal (FIG. 10). Similarly, both might be horizontal or both might be in a diagonal configuration (FIG. 11). In one embodiment, the device is configured to provide a plurality of aliquots of each combinatorial mixture of first and second liquids (FIG. 12).

Figure 13:
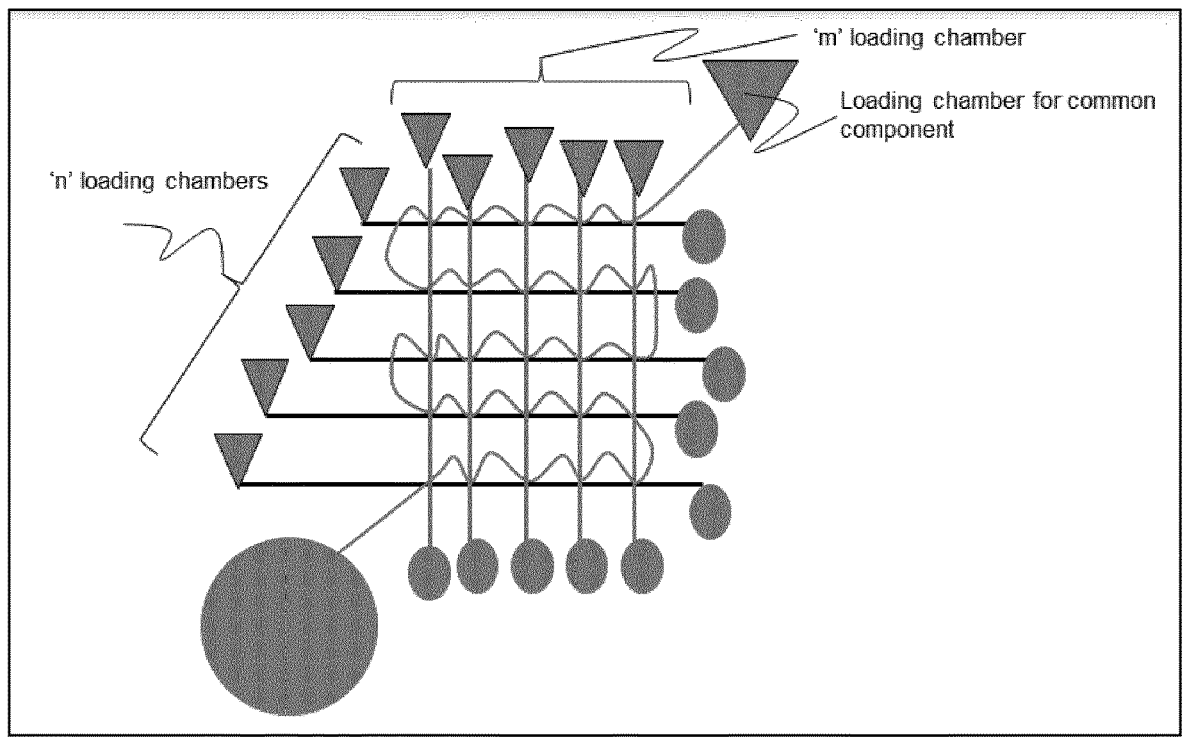
FIG. 13 illustrates another embodiment of a microfluidic device of the invention similar to the embodiment of FIG. 10 and in which the wavy line represents the fluid path of a third reagent which is common to all mixing chambers.

In an alternative configuration, additional reagents common to all combinatorial mixing chambers might be added through a dedicated channel (FIG. 13). For example, the 'M' loading chambers might contain biological samples containing DNA, the 'N' loading chamber might contain primers for PCR or an isothermal DNA amplification technique such as LAMP. The 'common' loading chamber channel might deliver common reagents such as fluorescence markers and DNA amplification enzymes (such as Taq Polymerase).

Figure 14:
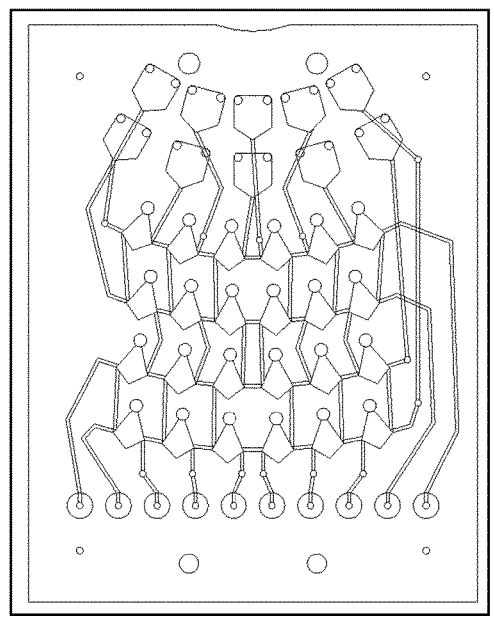
FIG. 14 illustrates another embodiment of a microfluidic device of the invention configured for metering and combinatorial four liquid samples with six liquid reagents. In this embodiment, the reservoirs and metering chambers for the four liquid samples are disposed in a first plane of the device and the reservoirs and metering chambers for the six liquid reagents are disposed in a second plane of the device, and the mixing chamber (illustrated in FIG. 5) spans the first and second planes.

FIG. 14 illustrates an alternative embodiment of the device of the invention which is similar to the device illustrated in FIG. 4.

Figure 15:
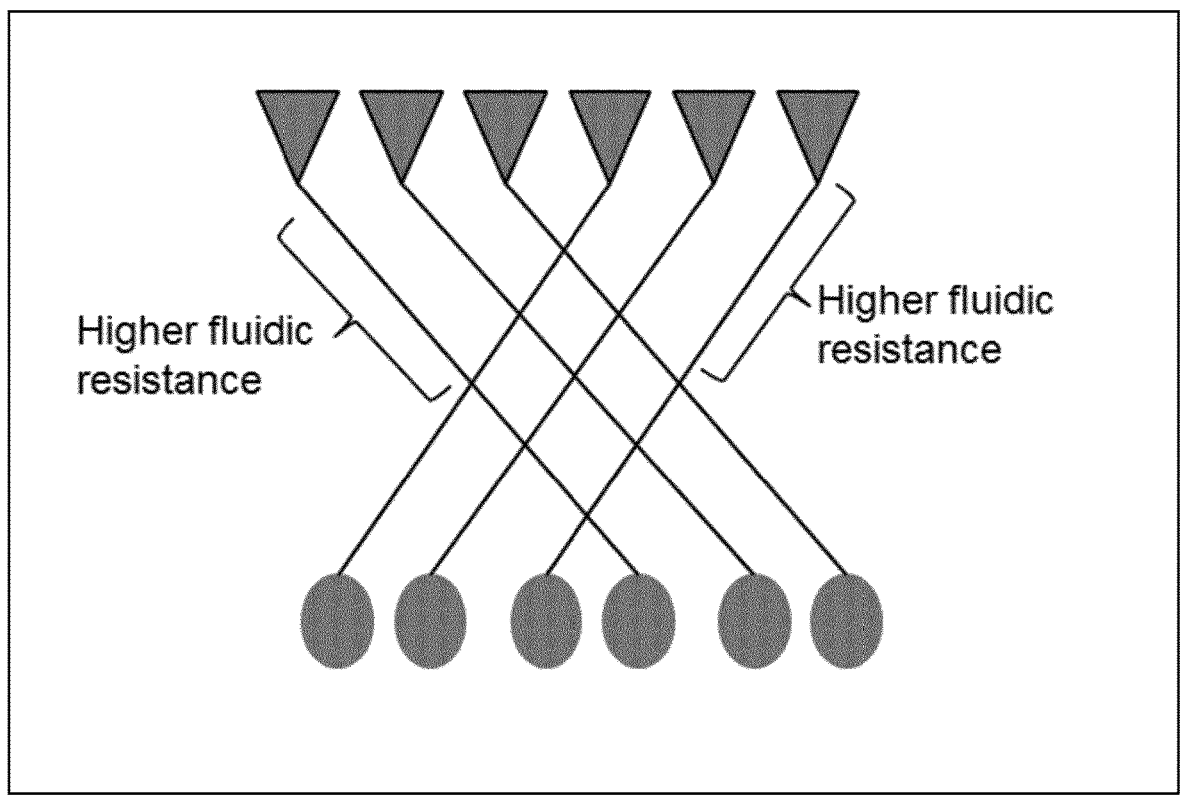
FIG. 15: Where the loading chambers are radially inward of the geometric barrier during the first centrifugal orientation it is critical that the microfluidic resistance be higher between the loading chambers and the first mixing chambers than further downstream in order to throttle the flow, and prevent overflow of the geometric barriers.

In cases where the loading chambers are placed radially inwards of the geometric barriers, the use of inbound microchannels with higher fluidic resistance is critical as this will throttle the flow through the chip and thus prevent overflow of the geometrical barriers which permit the samples to be metered without mixing during the initial centrifugation (FIG. 15

In one embodiment, the microfluidic device of the invention is formed from a conventional microtiter plate and an attachment for the microtiter plate that closes the wells and provides microfluidic connections between the wells of the plate. An embodiment is illustrated in FIG. 16 showing the wells 11 of the microtiter plate and an attachment 12 that is configured to attach to the plate and close the wells 11. The attachment 12 has a central section 13 having downwardly depending spouts 14, a first end section 15 having a plurality of upwardly depending wells, namely eight first reservoirs 16A and twelve second reservoirs 16B, and a second end section 17 having eight waste liquid chambers 18A and twelve waste liquid chambers 18B. The central section 13 contains metering chambers and first and second microfluidic conduits (not shown) configured to meter the first and second liquids into aliquots. Each metering chamber is fluidically connected to one of the downwardly depending spouts 14. The spouts are configured so that when the attachment 11 is attached to the microtiter plate, two spouts 14 will project into each well 11 of the microtiter plate to provide the two aliquots to be mixed, where the wells 11 act as the mixing chambers. The attachment is configured such that when it is exposed to a first directional force field, the liquids are forced from the reservoirs into the metering chambers, and when the device is exposed to a second directional force field, the liquids are forced from the metering chambers into the mixing chambers.

Figure 17:
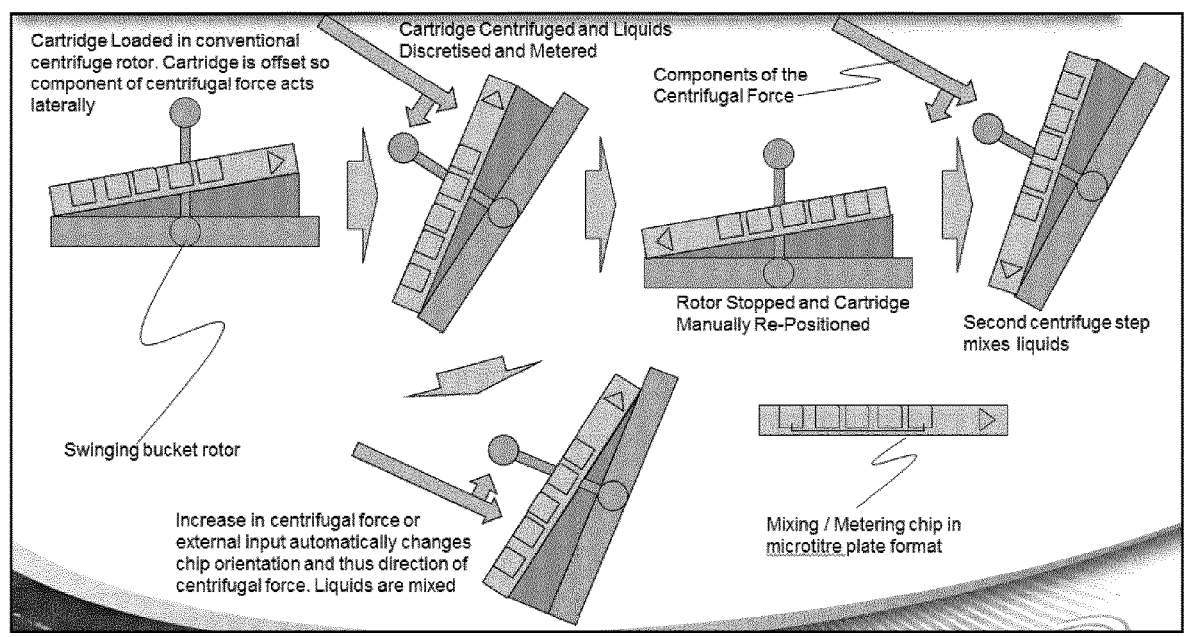
FIG. 17: An illustration of how the microfluidic chip of FIG. 16 may operate using a standard bucket-centrifuge. By orienting the flat microtitre plate at a slight angle in a standard centrifuge a centrifugal force component along the disc. Reversing the plate will reverse the direction of this force as part of the mixing step. Alternatively an automatic system can change the tilt of the plate in the centrifuge.

A method of using the device of FIG. 16 is described with reference to FIG. 17. In this embodiment, the device is assembled and the reservoirs are loaded with liquids, before the device is attached to a swinging bucket rotor centrifuge. The device is offset (i.e. 45 degrees) so that a component of the centrifugal force acts laterally. The device is centrifuged in this position, forcing liquids from the reservoirs into the metering chambers. The rotor is then stopped and the device is manually re-positioned as shown, and a second centrifuge step is carried out which forces liquid from the metering chambers into the wells of the microtiter plate through the spouts, where aliquots of the liquids mix.

Figure 18:
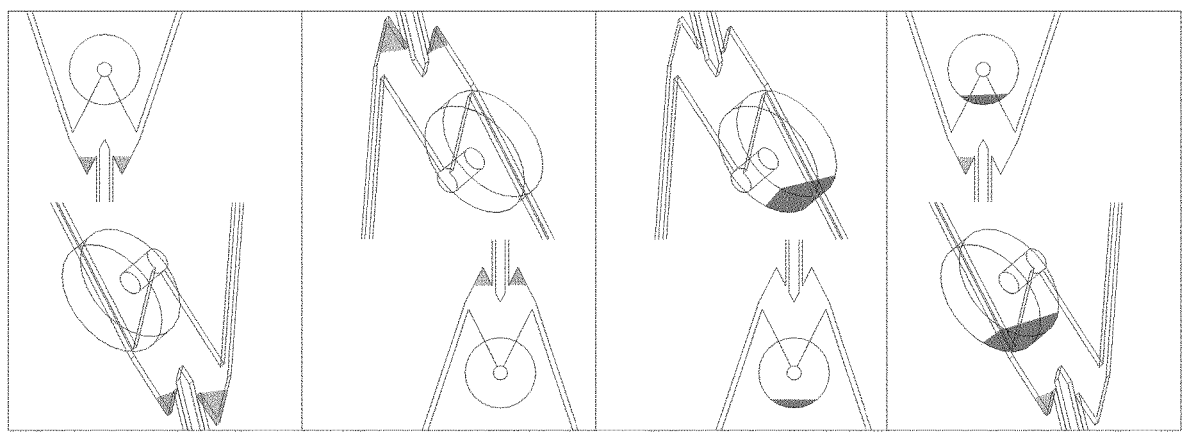
FIG. 18: A non-return valve or non-return structure integrated into the mixing structure can allow additional reagents to be added subsequent to the first combinatorial mixing step. It can also enable the combinatorial mixing to occur in multiple steps. The figure above shows a non-return structure where, following the second rotation, the mixed reagents are trapped in a recessed pocket where the volume will remain at the orientations used for centrifugation.

In another embodiment, illustrated in FIG. 18, the integration of a non-return geometry or non-return valve into the mixing chambers can enable the liquids be added to the chip in multiple steps or the addition of reagents in stages. For example, in the PCR case, the DNA polymerase might be loaded in a first step using one of two sets of loading inlets. In the second step, the primers can be loaded in using the same of loading inlets while the samples can be loaded through the second set of loading inlets. Thus the three components required can be added sequentially.

Figure 19:
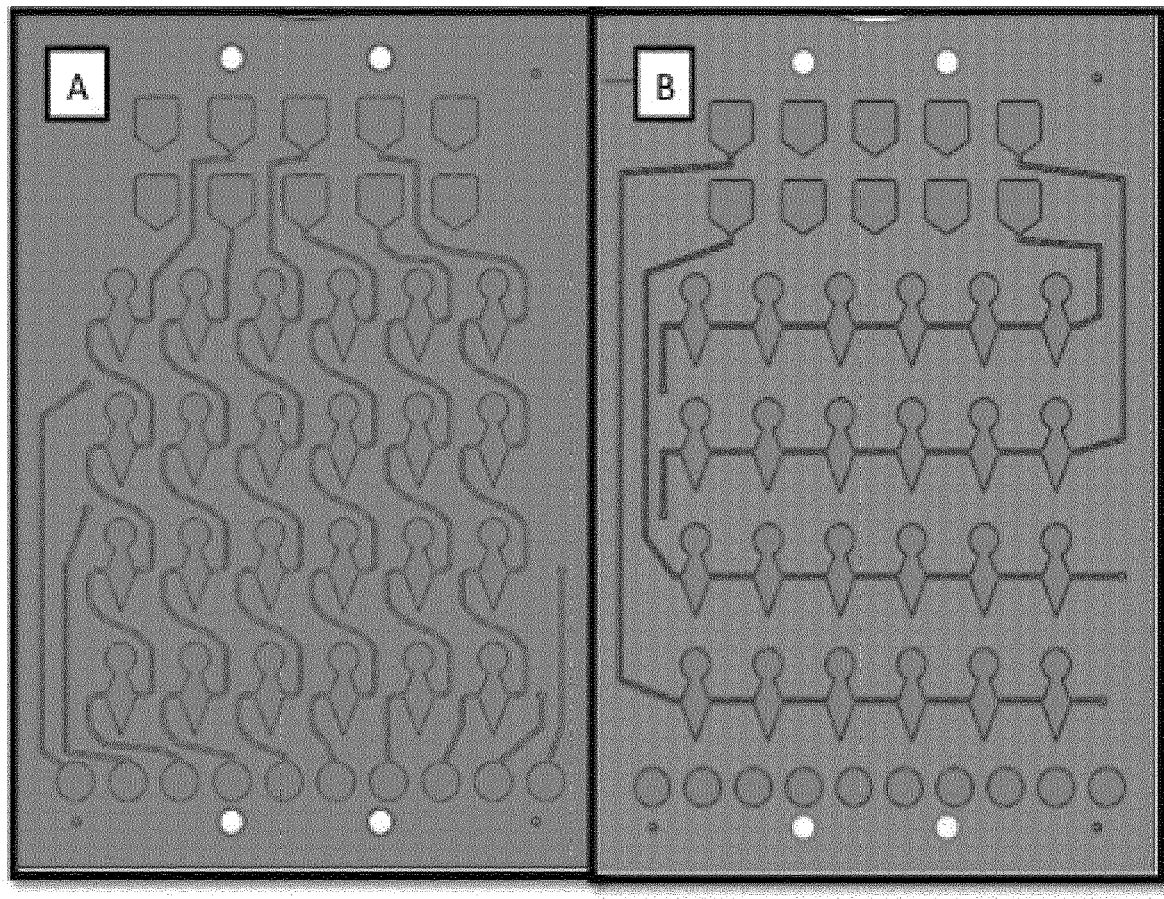
FIG. 19 illustrates a further embodiment of the device configured for pairwise combinatorial mixing of six first liquids with four second liquids and having combined metering/mixing chambers as shown in Figure. 5.

FIG. 19 illustrates a further embodiment of the device configured for pairwise combinatorial mixing of six first liquids with four second liquids and having combined metering/mixing chambers as shown in Figure. 5. FIG. 19A shows a first layer of the device and the first conduits providing fluidic connection from the six central reservoirs to 24 metering chambers. FIG. 19B shows a second layer of the device and the second conduits providing fluidic connection from the four outermost reservoirs to 24 metering chambers.

Figure 20:
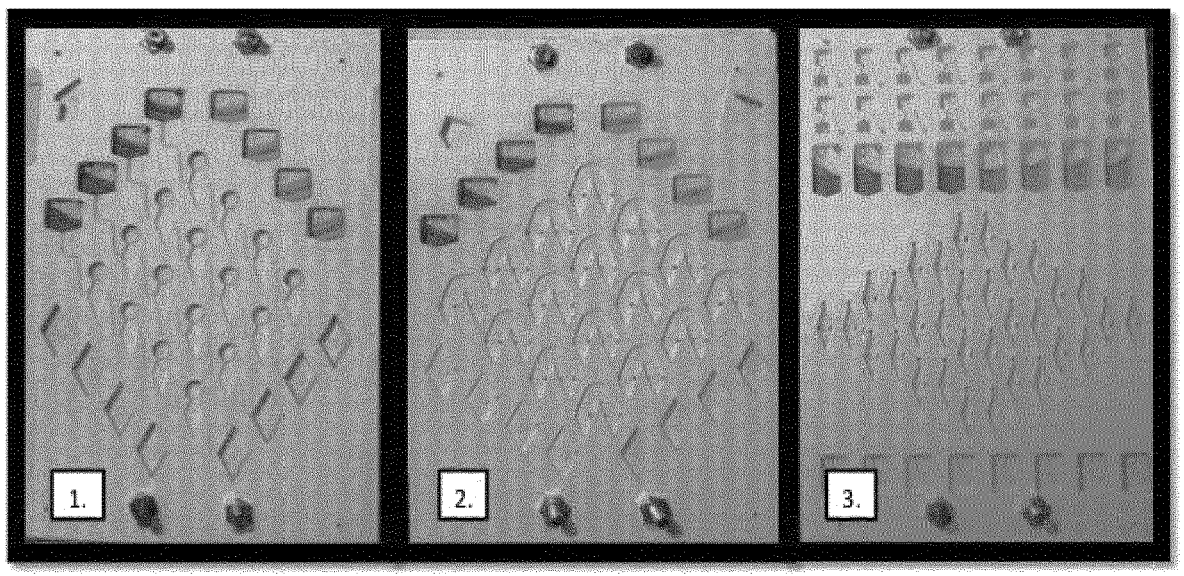
FIG. 20: Diamond Designs. (1.) Diamond-1 with circular mixing chambers and capture chambers on both the top and underside of the chip. (2.) Diamond-2 has arc shaped mixing chambers with all the capture chambers on the top of chip. (3.) Diamond-3 has mixing chambers above the loading chambers and also has all capture chambers on top of chip.

FIG. 20 illustrates devices of the invention having "diamond array" configurations of reservoirs and metering/mixing chambers (FIGS. 20.1 and 20.2) and a diamond array of metering chambers (FIG. 20.3). The embodiment of FIG. 20.1 has combined metering/mixing chambers as shown in FIG. 5. The embodiment of FIG. 20.2 has combined metering/mixing chambers as shown in FIG. 8.

The fluidic device may be employed for any method or procedure requiring combinatorial mixing of liquids including PCR amplification of nucleic acids (for example thermal or isothermal amplification), arraying of nucleic acids, assaying of chemical or drug libraries (for example to detect interactions between drugs and ligands), combinatorial chemistry, screening libraries of chemical or biological materials, immunochemical reactions, PCR-based genotyping, nucleic acid screening for pharmacogenomic or chemotherapeutic screening, nucleic acid microarray hybridisation, screening or monitoring of environmental or forensic samples, or LAMP amplification of nucleic acids.

EQUIVALENTS

The foregoing description details presently preferred embodiments of the present invention. Numerous modifications and variations in practice thereof are expected to occur to those skilled in the art upon consideration of these descriptions. Those modifications and variations are intended to be encompassed within the claims appended hereto.

REFERENCES

1. J. Ducrée, S. Haeberle, S. Lutz, S. Pausch, F. Von Stetten and R. Zengerle, Journal of Micromechanics and Microengineering, 2007, 17, S103.
2. M. Madou, J. Zoval, G. Jia, H. Kido, J. Kim and N. Kim, Annu. Rev. Biomed. Eng., 2006, 8, 601-628.
3. R. Gorkin, J. Park, J. Siegrist, M. Amasia, B. S. Lee, J.-M. Park, J. Kim, H. Kim, M. Madou and Y.-K. Cho, Lab on a Chip, 2010, 10, 1758-1773.
4. C. E. Nwankire, G. G. Donohoe, X. Zhang, J. Siegrist, M. Somers, D. Kurzbuch, R. Monaghan, M. Kitsara, R. Burger and S. Hearty, Analytical chemical acta, 2013, 781, 54-62.
5. M. C. Kong and E. D. Salin, Analytical chemistry, 2012, 84, 10038-10043.
6. H. Hwang, Y. Kim, J. Cho, J.-y. Lee, M.-S. Choi and Y.-K. Cho, Analytical chemistry, 2013, 85, 2954-2960.
7. M. Czugala, R. Gorkin III, T. Phelan, J. Gaughran, V. F. Curto, J. Ducrée, D. Diamond and F. Benito-Lopez, Lab on a Chip, 2012, 12, 5069-5078.
8. J. M. Chen, P.-C. Huang and M.-G. Lin, Microfluidics and Nanofluidics, 2008, 4, 427-437.
9. J. L. Moore, A. McCuiston, I. Mittendorf, R. Ottway and R. D. Johnson, Microfluidics and Nanofluidics, 2011, 10, 877-888.
10. T. H. G. Thio, S. Soroori, F. Ibrahim, W. Al-Faqheri, N. Soin, L. Kulinsky and M. Madou, Medical & biological engineering & computing, 2013, 51, 525-535.
11. T. Li, L. Zhang, K. M. Leung and J. Yang, Journal of Micromechanics and Microengineering, 2010, 20, 105024.
12. S. Haeberle, T. Brenner, R. Zengerle and J. Ducrée, Lab on a Chip, 2006, 6, 776-781.
13. R. Gorkin III, C. E. Nwankire, J. Gaughran, X. Zhang, G. G. Donohoe, M. Rook, R. O'Kennedy and J. Ducrée, Lab on a Chip, 2012, 12, 2894-2902.
14. C. E. Nwankire, M. Czugala, R. Burger, K. J. Fraser, T. Glennon, B. E. Onwuliri, I. E. Nduaguibe, D. Diamond and J. Ducrée, Biosensors and Bioelectronics, 2014, 56, 352-358.
15. D. Kinahan, S. Kearney and N. Dimov, Lab on a Chip, 2014, DOI: 10.1039/c4lc00380b, 2249-2258.
16. D. J. Kinahan, S. M. Kearney, O. P. Faneuil, M. T. Glynn, N. Dimov and J. Ducrée, RSC Advances, 2015, 5, 1818-1826.
17. T. van Oordt, Y. Barb, J. Smetana, R. Zengerle and F. von Stetten, Lab on a Chip, 2013, 13, 2888-2892.
18. H. Hwang, H.-H. Kim and Y.-K. Cho, Lab on a Chip, 2011, 11, 1434-1436.
19. D. Mark, P. Weber, S. Lutz, M. Focke, R. Zengerle and F. von Stetten, Microfluidics and Nanofluidics, 2011, 10, 1279-1288.
20. J. Siegrist, R. Gorkin, L. Clime, E. Roy, R. Peytavi, H. Kido, M. Bergeron, T. Veres and M. Madou, Microfluidics and nanofluidics, 2010, 9, 55-63.
21. M. Kitsara, C. E. Nwankire, L. Walsh, G. Hughes, M. Somers, D. Kurzbuch, X. Zhang, G. G. Donohoe, R. O'Kennedy and J. Ducrée, Microfluidics and nanofluidics, 2014, 16, 691-699.
22. R. Gorkin III, L. Clime, M. Madou and H. Kido, Microfluidics and nanofluidics, 2010, 9, 541-549.
23. N. Godino, R. Gorkin III, A. V. Linares, R. Burger and J. Ducrée, Lab on a Chip, 2013, 13, 685-694.
24. M. M. Aeinehvand, F. Ibrahim, W. Al-Faqheri, T. H. G. Thio, A. Kazemzadeh and M. Madou, Lab on a Chip, 2014, 14, 988-997.
25. F. Schwemmer, S. Zehnle, D. Mark, F. von Stetten, R. Zengerle and N. Paust, Lab on a Chip, 2015, 15, 1545-1553.
26. L. Clime, D. Brassard, M. Geissler and T. Veres, Lab on a Chip, 2015.
27. J. L. Garcia-Cordero, D. Kurzbuch, F. Benito-Lopez, D. Diamond, L. P. Lee and A. J. Ricco, Lab on a Chip, 2010, 10, 2680-2687.
28. B. S. Lee, Y. U. Lee, H.-S. Kim, T.-H. Kim, J. Park, J.-G. Lee, J. Kim, H. Kim, W. G. Lee and Y.-K. Cho, Lab on a Chip, 2011, 11, 70-78.
29. K. Abi-Samra, R. Hanson, M. Madou and R. A. Gorkin III, Lab on a Chip, 2011, 11, 723-726.
30. W. Al-Faqheri, F. Ibrahim, T. H. G. Thio, J. Moebius, K. Joseph, H. Arof and M. Madou, PloS one, 2013, 8, e58523.
31. China Patent Application CN 1477400 A Pat., 2004.
32. T. Kawai, N. Naruishi, H. Nagai, Y. Tanaka, Y. Hagihara and Y. Yoshida, Analytical chemistry, 2013, 85, 6587-6592.
33. M. Geissler, L. Clime, X. D. Hoa, K. J. Morton, H. Hebert, L. Poncelet, M. Deschenes, M. E. Gauthier, G. Huszczynski and N. Corneau, Analytical chemistry, 2015.
34. B. Miao, N. Peng, L. Li, Z. Li, F. Hu, Z. Zhang and C. Wang, Sensors, 2015, 15, 27954-27968.

The invention claimed is:

1. A fluidic device for aliquoting and pairwise combinatorial mixing of at least two first liquid samples with at least two second liquid samples, the microfluidic device comprising:
- a first reservoir for each of the at least two first liquid samples and a second reservoir for each of the at least two second liquid samples;
- at least two first aliquot chambers fluidically connected to each of first reservoirs by first microfluidic conduits having a first orientation relative to the device;
- at least two second aliquot chambers fluidically connected to each of the second reservoirs by second microfluidic conduits having a first orientation relative to the device;
- at least four mixing chambers, in which each mixing chamber is fluidically connected to at least one of the first aliquot chambers and at least one of the second aliquot chambers by third microfluidic conduits having a second orientation relative to the device,
- wherein the first and second microfluidic conduits are configured such that application of a first rotor-driven unidirectional centrifugal force field effects liquid flow in the first orientation to generate aliquots of the at least two first liquid samples in the first aliquot chambers and the at least two second liquid samples in the second aliquot chambers,
- wherein the third microfluidic conduits are configured such that application of a second rotor-driven unidirectional centrifugal force field effects liquid flow in the second orientation to combinatorially combine aliquots of the at least two first liquid samples with aliquots of the at least two second liquid samples in a pairwise manner,
- wherein the third microfluidic conduits are configured to extend against the direction of the first rotor-driven unidirectional centrifugal force field to prevent movement of liquid from the first aliquot chambers and second aliquot chambers to the mixing chambers during application of the first rotor-driven unidirectional centrifugal force field,
- wherein at least some of the conduits are spatially separated across the Y-axis of the device.

2. The fluidic device according to claim 1 in which the fluidic device is a microfluidic device.

3. The fluidic device according to claim 1 in which one or more of the microfluidic conduits has at least one part in one plane of the device and at least a second part in a second plane of the device, and at least one orthogonal component providing fluidic connection between the at least first and second parts.

4. The fluidic device according to claim 1 in which some of the microfluidic conduits are provided in one plane of the device and other microfluidic conduits are provided in a second plane of the device.

5. A fluidic device according to claim 1 in which the first microfluidic conduits are disposed in a first plane of the device and the second microfluidic conduits are disposed in a second plane of the device.

6. The fluidic device according to claim 1 in which at least one of the first reservoirs is fluidically connected to the at least two first aliquot chambers in series, wherein the first aliquot chambers are fluidically connected by means of an overflow mechanism configured to meter a defined aliquot volume into the aliquot chambers.

7. The microfluidic device according to claim 1 in which at least one of the first reservoirs is fluidically connected to the at least two first aliquot chambers in series, wherein the first aliquot chambers are fluidically connected by means of an overflow mechanism configured to meter a defined aliquot volume into the aliquot chambers, and in which a final aliquot chamber in the series has an overflow fluidically connected to a waste chamber.

8. The fluidic device according to claim 1 in which at least one of the mixing chambers and fluidically connected first and second aliquot chambers are provided by a single chamber (aliquot/mixing chamber) having aliquot regions and a mixing region disposed such that application of the second directional force field effects liquid flow from the aliquot regions to the mixing region.

9. The fluidic device according to claim 1 in which at least one of the mixing chambers and fluidically connected first and second aliquot chambers are provided by a single chamber (aliquot/mixing chamber) having aliquot regions and a mixing region disposed such that application of the second directional force field effects liquid flow from the aliquot regions to the mixing region, and in which the aliquot regions and mixing region are disposed on opposite ends of the single chamber.

10. The fluidic device according to claim 1 in which at least one of the mixing chambers comprises a trap structure configured to prevent liquid in the mixing chamber returning to the associated aliquot chambers upon application of the first directional force field.

11. The fluidic device according to claim 1, in which at least one of the mixing chambers comprises a trap structure configured to prevent liquid in the mixing chamber returning to the associated aliquot chambers upon application of the first directional force field, and including a liquid collection chamber fluidically connected the trap structures of the mixing chamber by collection conduits, wherein the collection conduits are configured to force the liquid in the mixing chambers to the collection chamber upon application of a directional force field.

12. The fluidic device according to claim 1 including a third reservoir for a third liquid sample, and a conduit configured to deliver an aliquot of the third liquid sample to one or more of the mixing chambers.

13. The fluidic device according to claim 1 in which the first and second microfluidic conduits are configured to have a higher fluidic resistance than the third microfluidic conduits.

14. The fluidic device according to claim 1 in which the third microfluidic conduits have a radially inward configuration.

15. The fluidic device according to claim 1, in which the combined aliquot/mixing chambers are arrayed in a diamond configuration.

16. The fluidic device according to claim 1 in the form of a planar chip.

17. The fluidic device according to claim 1 comprising a microtitre plate having a multiplicity of wells, and an attachment for the plate comprising the reservoirs, aliquot chambers, and conduits, wherein the wells of the plate are the mixing chambers.

18. The fluidic device according to claim 17 comprising a microtitre plate having a multiplicity of wells, and an attachment for the plate comprising the reservoirs, aliquot chambers, and conduits, wherein the wells of the plate are the mixing chambers, and in which the attachment comprises a first region comprising the reservoirs, a second region configured to attach to a top of the microtiter plate to close some or all of the wells of the plate, wherein an underside of the second region comprises a plurality of spouts configured to project into wells of the plate when the device is assembled.

19. The microfluidic device according to claim 1 in which the aliquot chambers are metering chamber and in which the combined aliquot/mixing chambers are combined metering/mixing chambers.

20. A microfluidic fluidic device for aliquoting and pairwise combinatorial mixing of at least three first liquid samples with at least three second liquid samples, the microfluidic device comprising:

six reservoirs comprising a first reservoir for each of the three first liquid samples and a second reservoir for each of the three second liquid samples;

eighteen aliquot chambers comprising:
three first aliquot chambers fluidically connected to each of the first reservoirs by first microfluidic conduits having a first orientation relative to the device;
three second aliquot chambers fluidically connected to each of the second reservoirs by second microfluidic conduits having a first orientation relative to the device;

nine mixing chambers, in which each mixing chamber is fluidically connected to at least one of the first aliquot chambers and at least one of the second aliquot chambers by third microfluidic conduits having a second orientation relative to the device, wherein the first and second microfluidic conduits are configured such that application of a first rotor-driven unidirectional centrifugal force field effects liquid flow in the first orientation to generate three aliquots of each of the three first liquid samples in the first aliquot chambers and three aliquots of each of the three second liquid samples in the second aliquot chambers, wherein the third microfluidic conduits are configured such that application of a second rotor-driven unidirectional centrifugal force field effects liquid flow in the second orientation to combinatorially combine aliquots of the three-first liquid samples with aliquots of the three second liquid samples in a pairwise manner, wherein the third microfluidic conduits are configured to extend against the direction of the first rotor-driven unidirectional centrifugal force field to prevent movement of liquid from the first aliquot chambers and second aliquot chambers to the mixing chambers during application of the first rotor-driven unidirectional centrifugal force field, wherein at least some of the conduits are spatially separated across the Y-axis of the device.

21. A fluidic device for aliquoting and pairwise combinatorial mixing of at least two first liquid samples with at least two second liquid samples, the microfluidic device comprising:

a first reservoir for each of the at least two first liquid samples and a second reservoir for each of the at least two second liquid samples;

at least two first aliquot chambers fluidically connected to each of first reservoirs by first microfluidic conduits having a first orientation relative to the device;

at least two second aliquot chambers fluidically connected to each of the second reservoirs by second microfluidic conduits having a first orientation relative to the device;

at least four mixing chambers, in which each mixing chamber is fluidically connected to at least one of the first aliquot chambers and at least one of the second aliquot chambers by third microfluidic conduits having a second orientation relative to the device, wherein the first and second microfluidic conduits are configured such that application of a first rotor-driven unidirectional centrifugal force field effects liquid flow in the first orientation to generate aliquots of the at least two first liquid samples in the first aliquot chambers and the at least two second liquid samples in the second aliquot chambers, wherein the third microfluidic conduits are configured such that application of a second rotor-driven unidirectional centrifugal force field effects liquid flow in the second orientation to combinatorially combine aliquots of the at least two first liquid samples with aliquots of the at least two second liquid samples in a pairwise manner, wherein at least some of the conduits are spatially separated across the Y-axis of the device, and wherein the first and second microfluidic conduits are configured to have a higher fluidic resistance than the third microfluidic conduits.

22. A fluidic device for aliquoting and pairwise combinatorial mixing of at least two first liquid samples with at least two second liquid samples, the microfluidic device comprising:

a first reservoir for each of the at least two first liquid samples and a second reservoir for each of the at least two second liquid samples;

at least two first aliquot chambers fluidically connected to each of first reservoirs by first microfluidic conduits having a first orientation relative to the device;

at least two second aliquot chambers fluidically connected to each of the second reservoirs by second microfluidic conduits having a first orientation relative to the device;

at least four mixing chambers, in which each mixing chamber is fluidically connected to at least one of the first aliquot chambers and at least one of the second aliquot chambers by third microfluidic conduits having a second orientation relative to the device, wherein the first and second microfluidic conduits are configured such that application of a first rotor-driven unidirectional centrifugal force field effects liquid flow in the first orientation to generate aliquots of the at least two first liquid samples in the first aliquot chambers and the at least two second liquid samples in the second aliquot chambers, wherein the third microfluidic conduits are configured such that application of a second rotor-driven unidirectional centrifugal force field effects liquid flow in the second orientation to combinatorially combine aliquots of the at least two first liquid samples with aliquots of the at least two second liquid samples in a pairwise manner, wherein at least some of the conduits are spatially separated across the Y-axis of the device, and including a third reservoir for a third liquid sample, and a conduit configured to deliver an aliquot of the third liquid sample to the at least four mixing chambers.

* * * * *